(12) United States Patent
Calise et al.

(10) Patent No.: US 7,769,703 B2
(45) Date of Patent: Aug. 3, 2010

(54) SYSTEM, APPARATUS AND METHODS FOR AUGMENTING A FILTER WITH AN ADAPTIVE ELEMENT FOR TRACKING TARGETS

(75) Inventors: Anthony J. Calise, Collegeville, PA (US); Venkatesh K. Madyastha, Karnataka (IN)

(73) Assignee: Georgia Tech Research Corporation, Atlanta, GA (US)

( * ) Notice: Subject to any disclaimer, the term of this patent is extended or adjusted under 35 U.S.C. 154(b) by 906 days.

(21) Appl. No.: 11/561,391

(22) Filed: Nov. 18, 2006

(65) Prior Publication Data
US 2010/0030716 A1 Feb. 4, 2010

Related U.S. Application Data

(60) Provisional application No. 60/738,302, filed on Nov. 18, 2005.

(51) Int. Cl.
*G05B 13/02* (2006.01)
(52) U.S. Cl. .......................... 706/23; 382/103; 348/169
(58) Field of Classification Search ............. 706/20–25; 348/169–172; 382/103, 155–161; 700/48
See application file for complete search history.

(56) References Cited

U.S. PATENT DOCUMENTS 6,351,740 B1 * 2/2002 Rabinowitz .................. 706/22
7,306,337 B2 * 12/2007 Ji et al. ........................ 351/209
2002/0099677 A1 7/2002 Calise et al.
2005/0137724 A1 6/2005 Hovakimyan et al.
2005/0182499 A1 * 8/2005 Calise et al. .................. 700/28

OTHER PUBLICATIONS

Madyastha & Calise, An Adaptive Filtering Approach to Target Tracking, 2005, American COntrol Conference Jun. 8, 2005, pp. 1269-1274.*
New directions in nonlinear observer design. In H. Nijmeijer and T. Fossen, editors, Lecture Notes in Control and Information Sciences 244. Springer Verlag, London, 1999.
A.J. Krener and A. Isidori. Linearization by output injection and nonlinear observers. Syst. Contr. Letters, 3:47, 1983.
D. Bestle and M. Zeitz. Canonical form observer design for nonlinear time variable systems. Int. J. Control, 38:419-431, 1983.

(Continued)

*Primary Examiner*—David R Vincent
(74) *Attorney, Agent, or Firm*—Patents and Licensing LLC; Daniel W. Juffernbruch

(57) ABSTRACT

A system in accordance with the invention uses an adaptive element to augment a filter for tracking an observed system. The adaptive element only requires a single neural network and does not require an error observer. The adaptive element provides robustness to parameter uncertainty and unmodeled dynamics present in the observed system for improved tracking performance over the filter alone. The adaptive element can be implemented with a linearly parameterized neural network, whose weights are adapted online using error residuals generated from the Filter. Boundedness of the signals generated by the system can be proven using Lyapunov's direct method and a backstepping argument. A related apparatus and method are also disclosed.

36 Claims, 12 Drawing Sheets

OTHER PUBLICATIONS

S. Nicosia, P. Tomei, and A. Tornambe. An approximate observer for a class of nonlinear systems. Syst. Contr. Letters, 12:43, 1989.

H.K. Khalil and A.N. Atassi, Separation results for the stabilization of nonlinear systems using different high gain observer designs. Syst. Contr. Letters, 39:183-191, 2000.

Emil Kalman, Rudolph. A new approach to linear filtering and prediction problems. Transactions of the ASME—Journal of Basic Engineering, 82(Series D):35-45, 1960.

D.G Luenberger. Observing the state of a linear system. IEEE Trans. Milit. Electr., 8:74, 1963.

A. H. Jazwinski. Stochastic Processes and Filtering Theory. New York: Academic, 1970.

Robert Grover Brown and Patrick Y. C. Hwang. Introduction to Random Signals and Applied Kalman Filtering. John Wiley and Sons, Inc., 1992.

P. Zarchan. Kalman Filters and the Homing Loop. Tactical and Strategic Missile Guidance (Second Edition), vol. 157. AIAA, 1994.

H. Cox. On the estimation of state variables and parameters for noisy dynamical systems. IEEE Transactions on Automatic Control, AC-9:5-12, Feb. 1964.

K. J. Astrom and P. Eykhoff. System identification—a survey. Automatica, 7:123-162, 1971.

A. P. Sage and C. D. Wakefield. Maximum likelihood identification of time varying and random system parameters. Int. J. Contr., 16(1):81-100, 1972.

Lennart Ljung. Asymptotic behaviour of the extended Kalman filter as a parameter estimator for linear systems. IEEE Transactions on Automatic Control, AC-24(1):36-50, Feb. 1979.

V. Panuska. A new form of the extended Kalman filter for parameter estimation in linear systems with correlated noise. IEEE Transactions on Automatic Control, AC-25(2):229-235, Apr. 1980.

L. Ljung. Analysis of recursive, stochastic algorithms. IEEE Transactions on Automatic Control, AC-22:551-575, Aug. 1977.

H. Weiss and J.B. Moore. Improved extended Kalman filter design for passive tracking. IEEE Transactions on Automatic Control, AC-25(4):807-811, Aug. 1980.

M. Boutayeb, H. Rafaralahy, and M. Darouach. Convergence analysis of the extended Kalman filter used as an observer for nonlinear deterministic discrete-time systems. IEEE Transactions on Automatic Control, 42(4):581-586, Apr. 1997.

Konrad Reif, Stefan Gunther, Engin Yaz, and Rolf Unbehauen. Stochastic stability of the discrete-time extended Kalman filter. IEEE Transactions on Automatic Control, 44(4):714-728, Apr. 1999.

Sergio Bittani and Sergio M. Savaresi. On the parameterization and design of an extended Kalman filter frequency tracker. IEEE Transactions on Automatic Control, 45(9):1718-1724, Sep. 2000.

R. P. Wishner, R. E. Larson, and M. Athans. Status of radar tracking algorithms. Proc. Symp. on Nonlinear Estimation Theory and Its Appl., San Diego, CA,:32-54, Sep. 1970.

Robert A. Singer. Estimating optimal tracking filter performance for manned maneuvering targets. IEEE Transactions on Aerospace and Electronic Systems, AES-6(4):473-483, Jul. 1970.

Per-Olof Gutman and Mordekhai Velger. Tracking targets using adaptive kalman filtering. IEEE Transactions on Aerospace and Electronic Systems, 26(5):691-699, Sep. 1990.

Taek Lyul Song. Observability of target tracking with range-only measurements. IEEE Journal of Ocean Engineering, 24(3):383-387, Jul. 1999.

C. B. Chang. Ballistic trajectory estimation with angle-only measurements. IEEE Transactions on Automatic Control, AC-25(3):474-480, Jun. 1980.

S. C Nardon and V. J Aidala. Observability criteria for bearings-only target motion analysis. IEEE Transactions on Aerospace and Electronic Systems, AES-17(2):162-166, Mar. 1981.

Vincent J. Aidala and Sherry E. Hammel. Utilization of modified polar coordinates for bearings-only tracking. IEEE Transactions on Automatic Control, AC-28(3):283-294, Mar. 1983.

Chaw-Bing Chang and John A. Tabaczynski. Application of state estimation to target tracking. IEEE Transactions on Automatic Control, AC-29(2):98-109, Feb. 1984.

T. L. Song and J. L. Speyer. A stochastic analysis of a modified gain extended Kalman filter with applications to estimation with bearings-only measurement. IEEE Transactions on Automatic Control, AC-30(10):940-949, Oct. 1985.

Taek Lyul Song. Observability of target tracking with bearings-only measurements. IEEE Transactions on Aerospace and Electronic Systems, 32(4):1468-1472, Oct. 1996.

Y. Kim, F.L. Lewis, and C. Abdallah. A dynamic recurrent neural network based adaptive observer for a class of nonlinear systems. Automatica, 33(8):1539-1543, 1998.

J. S. J. Lee and D. D. Nguyen. A learning network for adaptive target tracking. IEEE International Conference on Systems, Man and Cybernetics, pp. 173-177, Nov. 1990.

William A. Fisher and Herbert E. Rauch. Augmentation of an extended Kalman filter with a neural network. IEEE, pp. 1191-1196, 1994.

Stephen C. Stubberud, Robert N. Lobbia, and Mark Owen. An adaptive extended Kalman filter using artificial neural networks. Proceedings of the 34th Conference on Decision and Control, pp. 1852-1856, New Orleans, LA—Dec. 1995.

N. Hovakimyan, A.J. Calise, and V. Madyastha. An adaptive observer design methodology for bounded nonlinear processes. Proceedings of the 41st Conference on Decision and Control, 4:4700-4705, Dec. 2002.

N. Hovakimyan, H. Lee, A. Calise. On approximate NN realization of an unknown dynamic system from its input-output history. American Control Conference, 2000.

E. Lavretsky, N. Hovakimyan, and Calise A. Reconstruction of continuous-time dynamics using delayed outputs and feedforward neural networks, Accepted for publication in IEEE Transactions on Automatic Control.

K.S. Narendra and A.M. Annaswamy. A new adaptive law for robust adaptation without persistent excitation. IEEE Trans. Autom. Contr., 32(2):134-145, 1987.

P. Zarchan. Extended Kalman Filtering and Ballistic Coefficient Estimation. Tactical and Strategic Missile Guidance (Second Edition), vol. 157. AIAA, 1994.

International Search Report from corresponding International Application No. PCT/US2006/044895 dated May 10, 2007.

Harris, C. J., et al.. "Neurofuzzy state estimators and their applications," Conference Proceedings Article, May 25, 1999, pp. 5-1, figures 7, 8, XP006501364, UK.

Johnson, E. N., et al., "Approaches to vision-based formation control," Decision and Control, 2004. CDC. 43rd IEEE Conference on Nassau, Bahamas Dec. 14-17, 2004, Piscataway, NJ, USA IEEE, US, vol. 2, Dec. 14, 2004, pp. 1643-1648 vol. 2, XP010794489 ISBN: 0-7803-8682-5 (Abstract), Paris Island, Bahamas.

Menon, P. K., et al., "Adaptive target state estimation using neural networks," American Control Conference, 1999. Proceedings for the 1999 San Diego, CA, USA Jun. 2-4, 1999, Piscataway, NJ, USA, IEEE, US, vol. 4, Jun. 2, 1999, pp. 2610-2614, XP010344780, Palo Alto, CA.

* cited by examiner

ERROR SPACE

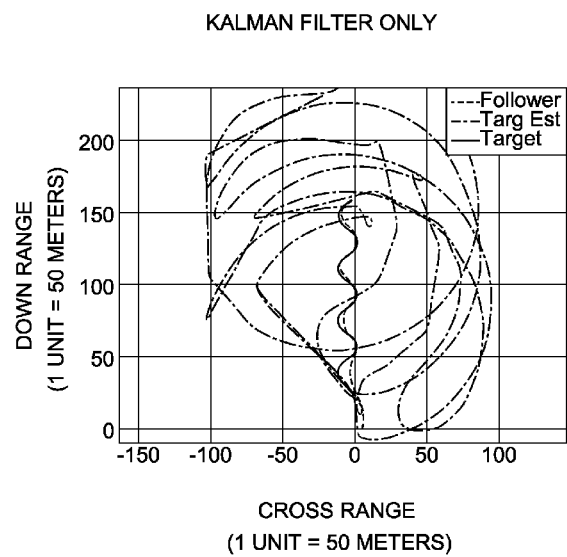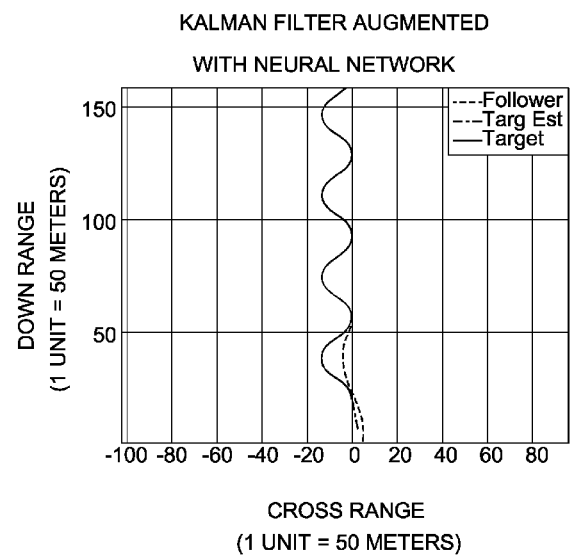
FIG. 7A
FIG. 7B

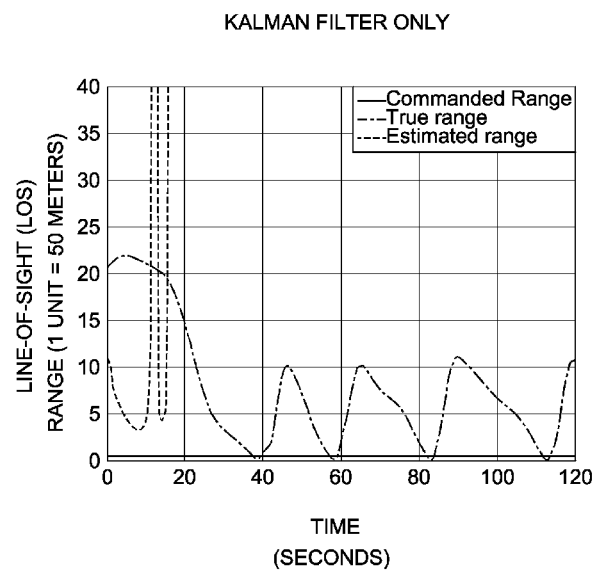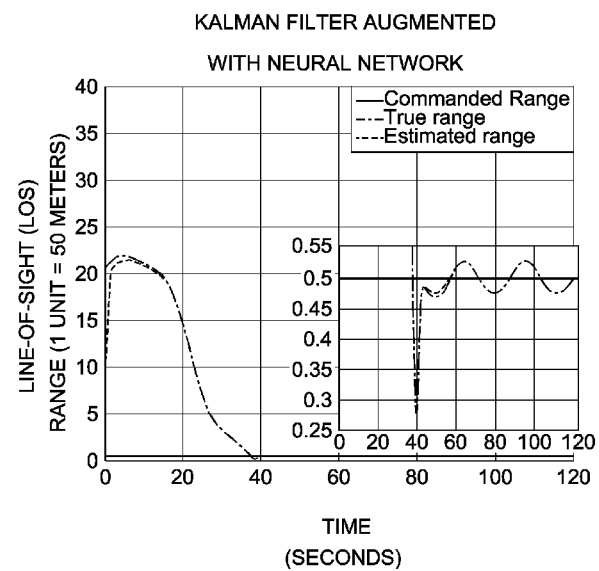
FIG. 8A
FIG. 8B

SYSTEM, APPARATUS AND METHODS FOR AUGMENTING A FILTER WITH AN ADAPTIVE ELEMENT FOR TRACKING TARGETS

CROSS-REFERENCE TO RELATED APPLICATIONS

This U.S. Nonprovisional application claims priority benefits under 35 U.S.C. 119(e)(1) to U.S. Provisional Application No. 60/738,302 filed Nov. 18, 2005, which is hereby incorporated by reference in full as if set forth hereinafter.

FEDERALLY SPONSORED RESEARCH OR DEVELOPMENT

This invention was made with United States Government support under Contract Nos. FA9550-04-1-0165, F49620-03-0401 and F49620-01-1-0024 awarded by the Air Force Office of Scientific Research (AFOSR). The United States Government has certain rights in the invention.

BACKGROUND OF THE INVENTION

1. Field of the Invention

The invention is generally directed to technology to track, and optionally to control, an observed system or "target" or a platform for observing the target. Embodiments of the invention can be applied to track virtually any kind of target, including air, space, water or land-borne vehicles, missiles, munitions, astronomical phenomena such as stars, planets, moons, asteroids, meteors, or biological phenomenon such as microorganisms or cells, etc. The invention can also be applied to a vehicle or machine for use in obstacle avoidance. Embodiments of the invention can be applied to control the target such as in the context of the target being a robotic arm or machine part. Other embodiments can be applied to control a platform such as a vehicle or the like, to keep a target under observation.

2. Description of the Related Art

The problem of state estimation of nonlinear stochastic systems is a widely encountered problem in science and engineering and has received a considerable amount of attention since the early development of methods for linear state estimation. [1] New directions in nonlinear observer design. In H. Nijmeijer and T. Fossen, editors, *Lecture Notes in Control and Information Sciences* 244. Springer Verlag, London, 1999; [2] A. J. Krener and A. Isidori. Linearization by output injection and nonlinear observers. *Syst. Contr. Letters,* 3:47, 1983; [3] D. Bestle and M. Zeitz. Canonical form observer design for nonlinear time variable systems. *Int. J. Control,* 38:419-431, 1983; [4] S. Nicosia, P. Tomei, and A. Tomambe. An approximate observer for a class of nonlinear systems. *Syst. Contr. Letters,* 12:43, 1989; [5] H. K. Khalil and A. N. Atassi, Separation results for the stabilization of nonlinear systems using different high gain observer designs. *Syst. Contr. Letters,* 39:183-191, 2000. In the case of linear dynamical systems with white process and measurement noise, the filter is known to be an optimal estimator. [6] Emil Kalman, Rudolph. A new approach to linear filtering and prediction problems. *Transactions of the ASME—Journal of Basic Engineering,* 82(Series D):35-45, 1960, while for linear systems with deterministic disturbances the Luenberger observer offers a complete and comprehensive solution for the problem of state estimation. [7] D. G Luenberger. Observing the state of a linear system. *IEEE Trans. Milit. Electr.,* 8:74, 1963. Of the numerous attempts being made for the development of nonlinear estimators, the most popular one is the extended Kalman filter (EKF), whose design is based on a first order local linearization of the system around a reference trajectory at each time step. [8] A. H. Jazwinski. *Stochastic Processes and Filtering Theory.* New York: Academic, 1970; [9] Robert Grover Brown and Patrick Y. C. Hwang. *Introduction to Random Signals and Applied Filtering.* John Wiley and Sons, Inc., 1992; [10] P. Zarchan. *Tactical and Strategic Missile Guidance (Second Edition),* volume 57. AIAA, 1994. In addition to its application in the field of nonlinear state estimation, EKFs are also used to estimate the unknown parameters of stochastic linear dynamical systems as reported in [11] H. Cox. On the estimation of state variables and parameters for noisy dynamical systems. *IEEE Transactions on Automatic Control,* AC-9:5-12, February 1964; [12] K. J. Astrom and P. Eykhoff. System identification—a survey. *Automatica,* 7:123-162, 1971; [13] A. P. Sage and C. D. Wakefield. Maximum likelihood identification of time varying and random system parameters. *Int. J. Contr.,* 16(1):81-100, 1972; [14] Lennart Ljung. Asymptotic behaviour of the extended Kalman filter as a parameter estimator for linear systems. *IEEE Transactions on Automatic Control,* AC-24(1):36-50, February 1979; [15] V. Panuska. A new form of the extended Filter for parameter estimation in linear systems with correlated noise. *IEEE Transactions on Automatic Control,* AC-25(2):229-235, April 1980. Although parameter estimation of linear and nonlinear systems using EKFs has received a fair amount of attention, nonlinear state estimation using EKFs has become one of the most researched problems. [16] L. Ljung. Analysis of recursive, stochastic algorithms. *IEEE Transactions on Automatic Control,* AC-22:551-575, August 1977; [17] H. Weiss and J. B. Moore. Improved extended Filter design for passive tracking. *IEEE Transactions on Automatic Control,* AC-25(4):807-811, August 1980; [18] M. Boutayeb, H. Rafaralahy, and M. Darouach. Convergence analysis of the extended Kalman filter used as an observer for nonlinear deterministic discrete-time systems. *IEEE Transactions on Automatic Control,* 42(4):581-586, April 1997; [19] Konrad Reif, Stefan Gunther, Engin Yaz, and Rolf Unbehauen. Stochastic stability of the discrete-time extended Kalman filter. *IEEE Transactions on Automatic Control,* 44(4):714-728, April 1999; [20] Sergio Bittani and Sergio M. Savaresi. On the parameterization and design of an extended Kalman filter frequency tracker. *IEEE Transactions on Automatic Control,* 45(9):1718-1724, September 2000.

One important application of the EKF to date lies in the realm of target tracking-trajectory estimation and in the area of missile target interception. In [21] R. P. Wishner, R. E. Larson, and M. Athans. Status of radar tracking algorithms. *Proc. Symp. on Nonlinear Estimation Theory and Its Appl.,* San Diego, Calif., :32-54, September 1970, the authors have developed a set of tracking algorithms that are applicable for ballistic reentry vehicles, tactical missiles and airplanes. In [22] Robert A. Singer. Estimating optimal tracking filter performance for manned maneuvering targets. *IEEE Transactions on Aerospace and Electronic Systems,* AES-6(4):473-483, July 1970; [23] Per-Olof Gutman and Mordekhai Velger. Tracking targets using adaptive filtering. *IEEE Transactions on Aerospace and Electronic Systems,* 26(5):691-699, September 1990; [24] Taek Lyul Song. Observability of target tracking with range-only measurements. *IEEE Journal of Ocean Engineering,* 24(3):383-387, July 1999, the feasibility of target tracking is studied from a point of view of range-only measurements. However in some situations it may be impractical to measure the range, and state estimation using measurements of the line-of-sight or bearing angle is highly desirable. Hence, designing EKFs for target trackers with bearings-only measurement has been a widely studied subject. [25] C. B. Chang. Ballistic trajectory estimation with angle-only measurements. *IEEE Transactions on Automatic Control*, AC-25(3):474-480, June 1980; [26] S. C Nardon and V. J. Aidala. Observability criteria for bearings-only target motion analysis. *IEEE Transactions on Aerospace and Electronic Systems*, AES-17(2):162-166, March 1981; [27] Vincent J. Aidala and Sherry E. Hammel. Utilization of modified polar coordinates for bearings-only tracking. *IEEE Transactions on Automatic Control*, AC-28(3):283-294, March 1983; [28] Chaw-Bing Chang and John A. Tabaczynski. Application of state estimation to target tracking. *IEEE Transactions on Automatic Control*, AC-29(2):98-109, February 1984; [29] T. L. Song and J. L. Speyer. A stochastic analysis of a modified gain extended Kalman filter with applications to estimation with bearings-only measurement. *IEEE Transactions on Automatic Control*, AC-30(10):940-949, October 1985; [30] Taek Lyul Song. Observability of target tracking with bearings-only measurements. *IEEE Transactions on Aerospace and Electronic Systems*, 32(4):1468-1472, October 1996. In the case of bearing measurements the process may be unobservable unless the sensing vehicle executes a maneuver [26] S. C Nardon and V. J. Aidala. Observability criteria for bearings-only target motion analysis. *IEEE Transactions on Aerospace and Electronic Systems*, AES-17(2):162-166, March 1981, which further complicates the bearings-only problem.

A key to successful target tracking lies in the effective extraction of useful information about the target's state from observations. In the setting of estimation, this necessitates adding additional states to model the target dynamics. Consequently, the accuracy of the estimator depends on the accuracy to which the target behavior has been characterized. Target behavior not captured by modeling introduces estimation bias, and can even cause divergence in the estimate. To account for modeling errors in the process, neural network (NN) based adaptive identification and estimation schemes have been proposed. [31] Y. Kim, F. L. Lewis, and C. Abdallah. A dynamic recurrent neural network based adaptive observer for a class of nonlinear systems. *Automatica*, 33(8): 1539-1543, 1998; [32] J. S. J. Lee and D. D. Nguyen. A learning network for adaptive target tracking. *IEEE International Conference on Systems, Man and Cybernetics*, pages 173-177, November 1990; [33] William A. Fisher and Herbert E. Rauch. Augmentation of an extended Filter with a neural network. *IEEE*, pages 1191-1196, 1994; [34] Stephen C. Stubberud, Robert N. Lobbia, and Mark Owen. An adaptive extended Kalman filter using artificial neural networks. *Proceedings of the 34th Conference on Decision and Control*, pages 1852-1856, New Orleans, La.—December 1995; [35] N. Hovakimyan, A. J. Calise, and V. Madyastha. An adaptive observer design methodology for bounded nonlinear processes. *Proceedings of the 41st Conference on Decision and Control*, 4:4700-4705, December 2002. In [31], an approach is developed that augments a linear time invariant filter with an NN while in [32]-[35], schemes for augmenting an EKF with an NN are provided. However the approaches in [31]-[34] require knowledge of the full dimension of the system. In [35], an approach that does not require the knowledge of the full dimension of the system is developed. However, this approach only permits the augmentation of a steady state Kalman filter with an NN. Since it would be desirable to address target tracking problems which do not have a good model for the behavior of the target, it would be desirable to provide augmentation of an EKF with an NN which accounts for the unmodeled dynamics of the target and platform used to observe the target. Other background information is provided in [39] A. Isidori. *Nonlinear Control Systems, Springer, Berlin*, 1995.

BRIEF SUMMARY OF THE INVENTION

The present invention, in its various embodiments, overcomes the disadvantages of the related art as described above, and achieves advantages not heretofore possible.

Briefly described, disclosed embodiments of the system, apparatus and method in accordance with the invention use an adaptive element to augment a filter for tracking an observed system. The adaptive element provides robustness to parameter uncertainty and unmodeled dynamics present in the observed system for improved tracking performance over the filter alone. The adaptive element can be implemented with a neural network having connection weights adapted online using error residuals generated from the filter. Boundedness of the signals generated by the system is proven using Lyapunov's direct method and a backstepping argument.

One general embodiment is directed to a system for augmenting a filter to track an observed system having an actual output signal y that is observable. The system comprises a filter comprising an observer or estimator for generating an estimated state signal $\hat{x}$ representing the state of the observed system. The filter is connected to receive an output error signal $\tilde{y}$ that is a difference between an actual output signal y and an estimated output signal $\hat{y}$. The estimated output signal $\hat{y}$ is generated based on the estimated state signal $\hat{x}$. The filter is further connected to receive an augmenting adaptive signal $v_{ad}$. The filter configured to generate an improved estimated state signal $\hat{x}$ based on the output error signal $\tilde{y}$ and the augmenting adaptive signal $v_{ad}$. The system also comprises an adaptive unit connected to receive the output error signal $\tilde{y}$. The adaptive unit is configured to generate a training error signal vector $\hat{e}$ based on the output error signal $\tilde{y}$. The adaptive unit has an adaptive element (34) including a neural network (36) with connection weights updated based on the training error signal vector $\hat{e}$. The neural network is further connected to receive an input signal $\bar{\mu}$ based on the actual output signal y. The adaptive unit generates the augmenting adaptive signal $v_{ad}$ based on the input signal $\bar{\mu}$ and training error signal vector $\hat{e}$. The adaptive unit is connected to provide the augmenting adaptive signal $v_{ad}$ to the filter for use in generating the estimated state signal $\hat{x}$.

As extensions to the general embodiment, various additional features are possible. The filter can comprise a Kalman filter or an extended Kalman filter, for example. The adaptive unit can comprise a training signal generator to generate training error signal vector $\hat{e}$ based on the output error signal $\tilde{y}$. The neural network can employ the following weight update law $$\dot{\hat{e}} = (f_e(t,e) - K(t)C^T)e + B\hat{M}^T \sigma(\bar{\mu}) + B\epsilon(\bar{\mu})$$

$$\dot{\hat{M}} = \Gamma_M(\sigma(\bar{\mu})\tilde{y}^T + k_\alpha \|\tilde{y}\|\hat{M})$$

$$\tilde{y} = C^T e$$

in which $$f_e(t, e) = \sum_{i=1}^{\infty} \frac{1}{i!} \left. \frac{\partial^i f_0}{\partial x^i} \right|_{\hat{x}(t)} e^{i-1},$$

$\hat{M}$ is the connection weights of the neural network (36), $\sigma(\bar{\mu})$ are the basis functions of the neural network (36), $\Gamma_M$ is the learning rate of the neural network (36), and $k_o$ is the $\sigma$-modification gain. The training signal generator can comprise a linear error observer. The adaptive unit can comprise a signal optimizer generating the input signal $\bar{\mu}$ based on the actual output signal y which can be generated by one or more sensors. The apparatus can further comprise a delay unit for generating delayed values $y_d$ of the actual output signal y. The signal optimizer is connected to receive the actual output signal y from the sensor(s) and the delayed values $y_d$ for use in generating the input signal $\bar{\mu}$. The apparatus can comprise a control unit connected to receive the estimated state signal $\hat{x}$, a derivative $\dot{\hat{x}}$ of the estimate state signal $\hat{x}$, the estimated output signal $\hat{y}$, the actual output signal y, the augmenting adaptive control signal $v_{ad}$, the input signal $\bar{\mu}$ or the training error signal $\hat{e}$, or any combination of these signals, to generate a control signal u based on one or more of these signals. The control unit can be connected to provide the control signal u to control an actuator to affect the state of the observed system, or it can be connected to the filter for use in generating the estimated state signal $\hat{x}$, or both.

A relatively specific embodiment of the system is used to track an observed system, and comprises a filter and an adaptive unit which augments the tracking capability of the filter. The filter is connected to receive an output error signal $\tilde{y}$, and is connected to receive an augmenting adaptive signal $v_{ad}$ multiplied by a constant $B_1$ defined in this embodiment to be $B_1\hat{M}^T\sigma(\bar{\mu})$. The filter generates an estimated state signal $\hat{x}$ based on the output error signal $\tilde{y}$ and the signal $B_1\hat{M}^T\sigma(\bar{\mu})$. The adaptive unit is connected to receive the output error signal $\tilde{y}$, and can include a training signal generator (an optional element) that generates a training error signal vector $\hat{e}$ based on the output error signal $\tilde{y}$. The adaptive unit has an adaptive element including a neural network with connection weights $\hat{M}^T$ that are updated based on the training error signal vector $\hat{e}$. The adaptive unit further can have a delay unit (an optional element) for generating delayed values $y_d$ of an actual output signal y generated by at least one sensor based on dynamics of the observed system. The adaptive unit can further comprise a signal optimizer (an optional element) receiving delayed values $y_d$ of the actual output signal y to produce a normalized input signal $\bar{\mu}$ input to the neural network to generate the signal $B_1\hat{M}^T\sigma(\bar{\mu})$ input to the filter. The training signal generator generates the training error signal vector $\hat{e}$ and in one exemplary embodiment is configured to update the connection weights $\hat{M}$ using the following equations $$\dot{e} = (f_e(t,e) - K(t)C^T)e + B\tilde{M}^T\sigma(\bar{\mu}) + B\epsilon(\bar{\mu})$$

$$\dot{\hat{M}} = -\Gamma_M(\sigma(\bar{\mu})\tilde{y}^T + k_o\|\tilde{y}\|\hat{M})$$

$$\tilde{y} = C^T e$$

in which $$f_e(t, e) = \sum_{i=1}^{\infty} \frac{1}{i!} \frac{\partial^i f_0}{\partial x^i}\bigg|_{\hat{x}(t)} e^{i-1},$$

$K(t)$ is the gain history of the filter, B is a constant, $\tilde{M}^T$ is the transpose of a matrix of the connection weights of the neural network (36), $\sigma(\bar{\mu})$ are the basis functions of the neural network (36), $\Gamma_M$ is the learning rate of the neural network (36), $\epsilon(\bar{\mu})$ is a disturbance error signal resulting from unmodeled dynamics, uncertainty in the neural network parameters, or both, and $k_o$ is the $\sigma$-modification gain.

The system can be implemented to track the observed system. In addition to its tracking capability, the system can comprise a control unit (49) connected to receive the estimated state signal $\hat{x}$ and generating a control signal $u(\hat{x})$ based on the estimated state signal $\hat{x}$. The control unit can be connected to provide the control signal $u(\hat{x})$ to one or more actuators to affect the state of the system, the observed system, or both. The system can further comprise a multiplier unit connected to receive the control signal $u(\hat{x})$ from the control unit. The multiplier unit can multiply the control signal $u(\hat{x})$ by the constant $B_2$ to generate the signal $B_2u(\hat{x})$. The multiplier unit is connected to provide the signal $B_2u(\hat{x})$ to the filter for use in generating the estimated state signal $\hat{x}$. In embodiments in which the control unit is used, the delay unit is connected to receive the control signal $u(\hat{x})$ and generates delayed values $u_d$ of the control signal $u(\hat{x})$. The delay unit is connected to provide the control signal $u(\hat{x})$ and its delayed values $u_d$ to the signal optimizer for use in generating the normalized input signal $\bar{\mu}$. The system can comprise a node connected to receive the actual output signal y sensed by at least one sensor, and an estimated output signal $\hat{y}$ generated based on the estimated state signal $\hat{x}$ from the filter. The node generates the output error signal $\tilde{y}$ by differencing the actual output signal y and the estimated output signal $\hat{y}$.

The filter can be configured as a linear or nonlinear filter of virtually any order. In one disclosed embodiment, the filter is implemented as a second order filter comprising a multiplier, a function unit, a summing node and an integrator. The multiplier is connected to receive the output error signal $\tilde{y}$ and generates the signal $K(t)\tilde{y}$. The function unit is connected to receive the estimated state signal $\hat{x}$ and generates a signal $f(\hat{x})$ based thereon. The summing node is connected to receive the signal $B_1\hat{M}^T\sigma(\bar{\mu})$, the signal $K(t)\tilde{y}$ and the signal $f(\hat{x})$ and generates the derivative $\dot{\hat{x}}$ of the estimated state signal $\hat{x}$ based on the signal $B_1\hat{M}^T\sigma(\bar{\mu})$, the signal $K(t)\tilde{y}$ and the signal $f(\hat{x})$. The integrator is connected to receive the derivative $\dot{\hat{x}}$ of the estimated state signal $\hat{x}$ and generates the estimated state signal $\hat{x}$ based on the derivative $\dot{\hat{x}}$.

The system can be adapted for tracking, and optionally also for control, in a variety of contexts. For example, the system can be configured for implementation in a first aircraft following a second aircraft that is the observed system. Similarly, the system can also be configured for implementation in a first vehicle and the observed system can be a second vehicle. Moreover, the system can be configured for implementation in a vehicle and the observed system can be an obstacle that is to be avoided. Depending upon the nature of the sensor(s), the system can configured as an optical, radar or sonar tracking system controlled to be positioned relative to the observed system. Furthermore, the controlled system can be a missile and the observed system can be a target. Any of these or other implementations of the system are possible.

The system can be implemented as a processor coupled to a memory which stores a control program which is executed by the processor to perform the functions of the filter and adaptive unit as described herein. Alternatively, the filter and adaptive unit can be implemented as discrete units. The elements of the system can be digital, analog, or a hybrid of both.

The system can comprise a memory unit configured to receive and store one or more of the estimated state signal $\hat{x}$, the actual output signal y and the control signal $u(\hat{x})$. Moreover, the system can comprise a display unit for displaying one or more of the estimated state signal $\hat{x}$, the actual output signal y and the control signal $u(\hat{x})$. The display unit can convey to a human viewer the estimated state, actual output and control information generated using the system. The display unit can be provided in close proximity to the other elements of the system, or it may be located remotely, such as in the case of the filter and adaptive unit being included in an unmanned air vehicle (UAV), and the display unit being located in a ground station to monitor the tracking performance of the UAV relative to the observed system or target.

An apparatus in accordance with an embodiment of the invention comprises an adaptive unit connected to receive an output error signal $\tilde{y}$ that is a difference between an actual output signal y from one or more sensors and an estimated output signal $\hat{y}$. The estimated output signal $\hat{y}$ is generated based on an estimated state signal $\hat{x}$. The adaptive unit has a training signal generator generating a training error signal vector $\hat{e}$ based on the output error signal $\tilde{y}$. The adaptive unit has an adaptive element including a neural network with connection weights $\hat{M}$ updated based on the training error signal vector $\hat{e}$. The adaptive unit further has a delay unit for generating delayed values $y_d$ of an actual output signal y generated by at least one sensor based on dynamics the observed system, and generating delayed values $u_d$ of the control signal $u(\hat{x})$ generated by the control unit. The adaptive unit further has a signal optimizer receiving delayed values $u_d$ of the control signal $u(\hat{x})$ and the actual output signal y to produce a normalized input signal $\bar{\mu}$ input to the neural network to generate the augmenting adaptive signal $\hat{M}^T \sigma(\bar{\mu})$ that is output to a summing node of a filter for use in generating one or more states of the observed system, including the estimated state signal $\hat{x}$. The adaptive unit is configured to output the augmenting adaptive signal $\hat{M}^T \sigma(\bar{\mu})$ as the only signal provided from the adaptive unit to the filter, a distinction from the multiple inputs required of previous devices.

A method in accordance with an embodiment of the invention comprises the steps of generating an estimated state signal $\hat{x}$ with a filter; generating an estimated output signal $\hat{y}$ based on the estimated state signal $\hat{x}$; sensing an output of an observed system with at least one sensor to generate an actual output signal y; and differencing the actual output signal y and the estimated output signal $\hat{y}$ to generate an output error signal $\tilde{y}$. The method further comprises the step of generating a training error signal vector $\hat{e}$ with a training signal generator based on the output error signal $\tilde{y}$, and adapting the connection weights $\hat{M}$ of the neural network based on the training error signal vector $\hat{e}$. The method can comprise the step of generating delayed values $y_d$ of the actual output signal y. The method further comprises the steps of generating an input signal $\bar{\mu}$ based on the actual output signal y and optionally the delayed values $y_d$ of the actual output signal y; generating with the neural network an augmenting adaptive signal $v_{ad}$ based on the normalized input signal $\bar{\mu}$ and the training error signal vector $\hat{e}$; and providing the augmenting adaptive signal $v_{ad}$ to the filter for use in generating the estimated state signal $\hat{x}$.

The method can further comprise the steps of generating a control signal $u(\hat{x})$ based on the estimated state signal $\hat{x}$; controlling one or more of the system, the observed system, or both, using one or more actuators based on the control signal $u(\hat{x})$; and providing the control signal $u(\hat{x})$ for use by the filter in generating the estimated state signal $\hat{x}$. The control signal $u(\hat{x})$ can be used to activate the actuators to position the system to better observe the observed system. Alternatively, or in addition, the control signal $u(\hat{x})$ can be used to control the one or more actuators to position the sensor relative to the observed system based on the control signal $u(\hat{x})$. As another adjunct or alternative, the control signal $u(\hat{x})$ can be used to control the one or more actuators to cause the system to avoid the observed system. The method is thus highly versatile in the manner of its implementation.

The method can comprise storing values of one or more of the estimated state signal $\hat{x}$, the actual output signal y and control signal $u(\hat{x})$, in a memory unit to track the observed system, the system, or both. The method can further comprise displaying values of one or more of the estimated state signal $\hat{x}$, the actual output signal y and the control signal $u(\hat{x})$ on a display unit. This enables a human viewer, for example, to observe, locally or remotely, the current and past states or trajectory of the observed system on the display unit.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7A is a graph of down range versus cross range showing the position of a target aircraft, a follower aircraft, and the estimated position of the target in the case in which a filter alone is used to track the target;

FIG. 7B is a graph of down range versus cross range showing the position of a target aircraft, follower aircraft, and estimated position of the target in a case in which a filter augmented with a neural network in accordance with an embodiment of the invention is used to track the target;

FIG. 8A is a graph of line-of-sight (LOS) range versus time showing the commanded range for a follower aircraft to track a leader aircraft, the true range of the follower aircraft to the leader aircraft, and an estimated range between the follower aircraft and the leader aircraft for a case in which the follower aircraft uses a filter alone to track the leader aircraft;

Figure 9A:
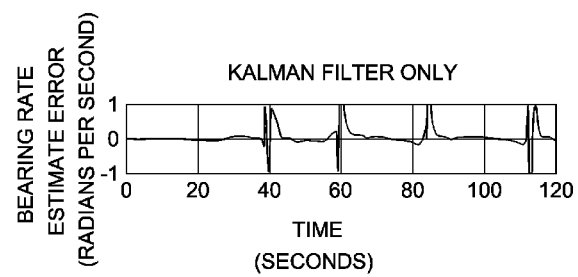
Figure 9B:
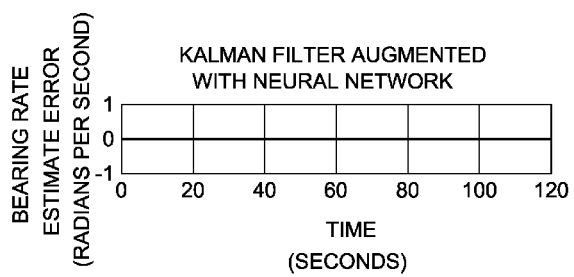
Figure 10A:
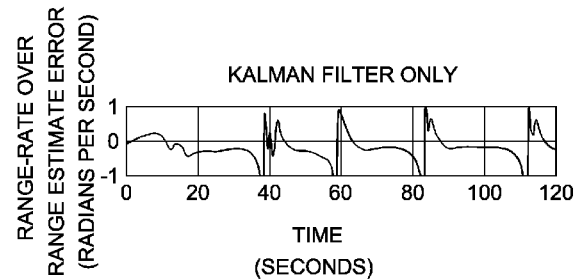
Figure 10B:
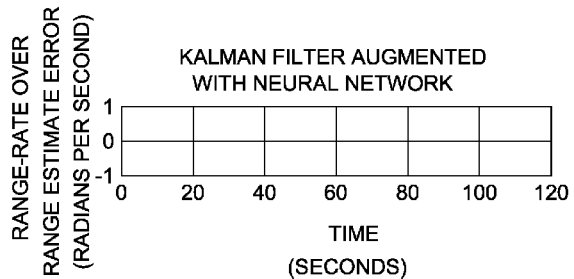
Figure 11A:
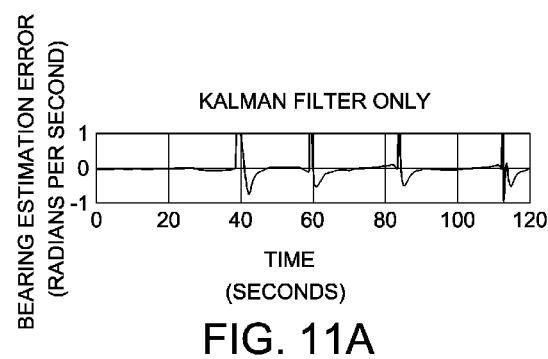
Figure 11B:
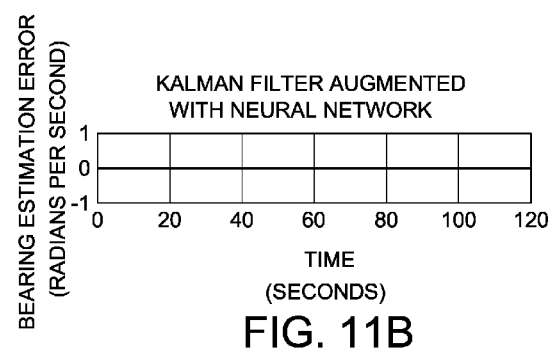
Figure 12A:
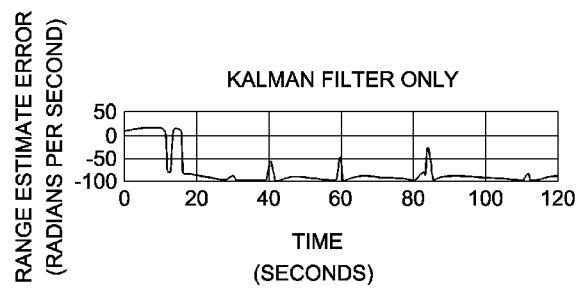
Figure 12B:
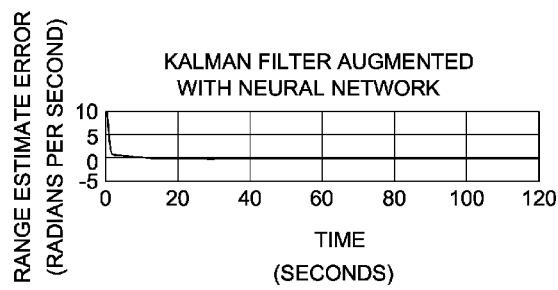
Figure 13:
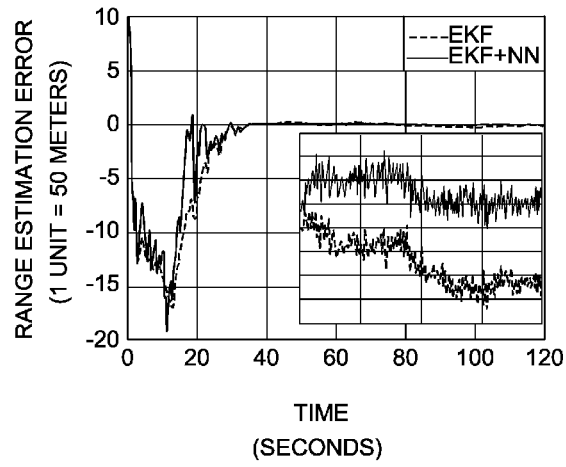
Figure 14:
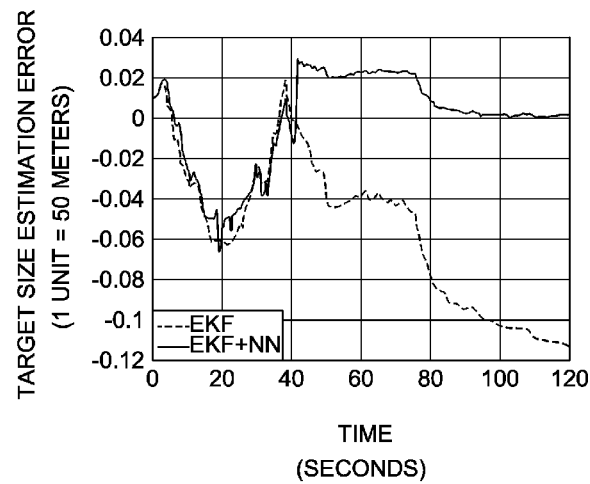

FIG. 8B is a graph of line-of-sight (LOS) range versus time showing the commanded range for a follower aircraft to track a leader aircraft, the true range of the follower aircraft to the leader aircraft, and an estimated range between the follower aircraft and the leader aircraft for a case in which the follower aircraft uses a filter augmented with a neural network in accordance with an embodiment of the invention is used to track the leader aircraft;

FIG. 9A is a graph of the bearing rate estimate error versus time for a case in which the follower aircraft uses a filter alone to track a leader aircraft;

FIG. 9B is a graph of the bearing rate estimate error versus time for a case in which the follower aircraft uses a filter augmented with a neural network to track a leader aircraft in accordance with the invention;

FIG. 10A is a graph of range-rate over range estimate error versus time for a case in which the follower aircraft uses a filter alone to track a leader aircraft;

FIG. 10B is a graph of range-rate over range estimate error versus time for a case in which the follower aircraft uses a filter augmented with a neural network to track a leader aircraft in accordance with the invention;

FIG. 11A is a graph of bearing estimation error versus time for a case in which the follower aircraft uses a filter alone to track a leader aircraft;

FIG. 11B is a graph of the bearing estimation error versus time for a case in which the follower aircraft uses a filter augmented with a neural network to track a leader aircraft in accordance with the invention;

FIG. 12A is a graph of range estimate error versus time for a case in which the follower aircraft uses a filter alone to track a leader aircraft;

FIG. 12B is a graph of range estimate error versus time for a case in which the follower aircraft uses a filter augmented with a neural network to track a leader aircraft in accordance with the invention;

FIG. 13 is a graph of range estimation error versus time for a filter alone versus a filter with neural network adaptive element in accordance with an embodiment of the invention; and FIG. 14 is a graph of target size estimate error versus time for a filter alone versus a filter augmented with a neural network in accordance with an embodiment of the invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

I. General Embodiment

Figure 1:
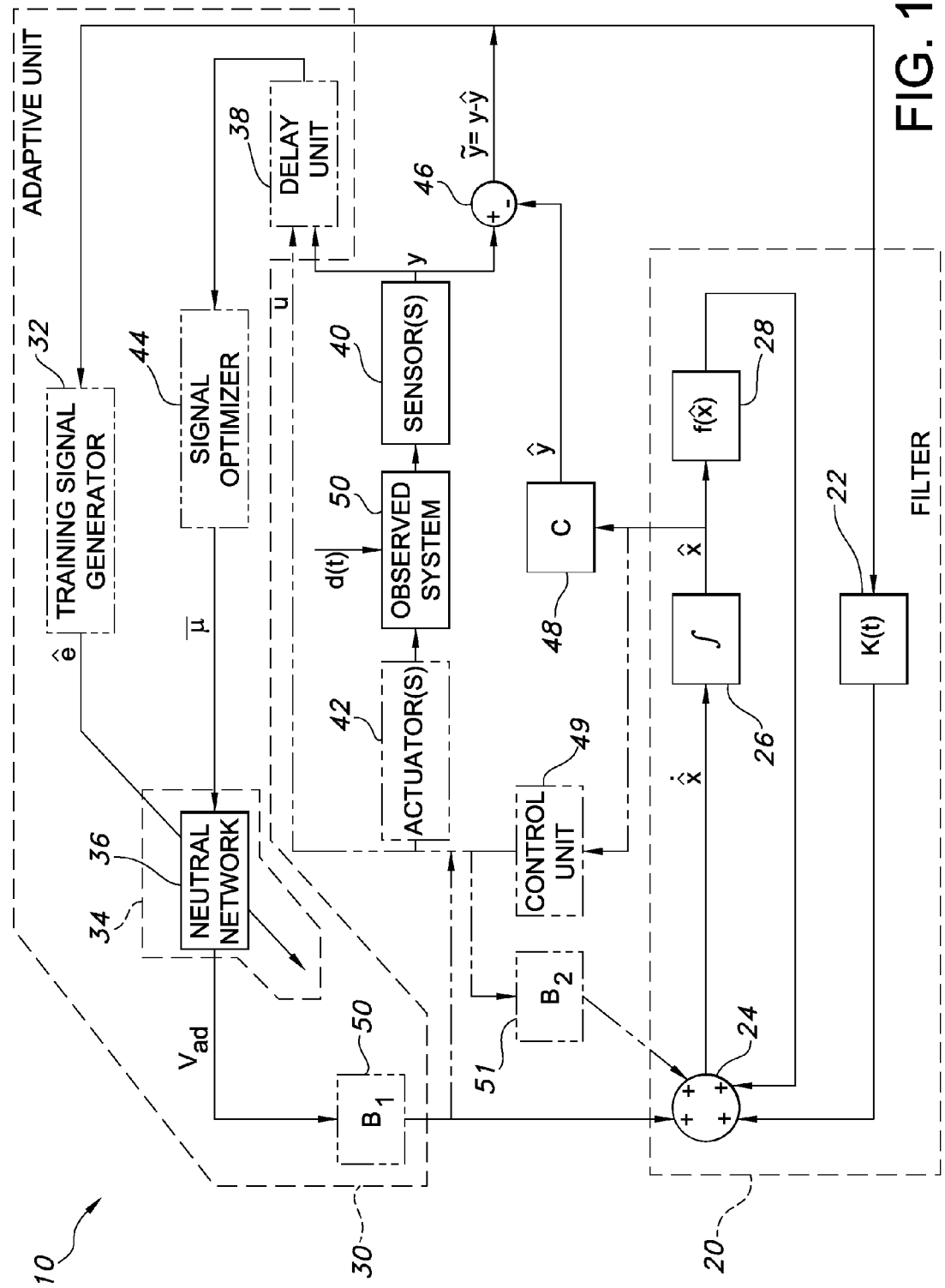
FIG. 1 is a block diagram of a system comprising a filter augmented with an adaptive unit having a neural network, and optional training signal generator, signal optimizer and delay unit, in accordance with a general embodiment of the invention.

FIG. 1 is a block diagram of a system 10 in accordance with an embodiment of the invention. The system 10 generally comprises a filter 20 and an adaptive unit 30 for tracking an observed system (or "target") 50. In general terms, the filter 20 performs nominal tracking control of the observed system 50. The adaptive unit 30 interacts with the filter 20 to adapt tracking performance of the system 10 to account for unmodeled dynamics and parametric uncertainty in the system 10 or the observed system 50, or both, in a stable manner.

The filter 20 of this embodiment is a second-order design. Those of ordinary skill in the art will appreciate that the filter 20 can be less than or greater than a second-order filter without departing from the scope of the invention.

In this embodiment, the filter 20 comprises a multiplier 22, summing node 24, integrator 26, and a function unit 28. The multiplier 22 multiplies the tracking error signal $\tilde{y}=y-\hat{y}$ by time-varying constant K(t). The resulting nonlinear signal is provided to summing node 24 along with a signal f($\hat{x}$) generated by unit 28. In addition, the summing node 24 receives signals $B_1\hat{M}^T\sigma(\bar{\mu})$ and $B_2u(\hat{x})$ from the adaptive unit 30. The summing node 24 adds these signals together to generate the derivative $\dot{\hat{x}}$ of the estimated state signal $\hat{x}$ in accordance with Equation (6) set forth in a later section of this document. This signal is integrated by integrator 26 and output to the adaptive unit 30. In addition, this signal is provided to the function unit 28 which generates the signal f($\hat{x}$) provided to the summing node 24. The function unit 28 implements the control law of the filter in accordance with Equations (3) and (4) set forth in a later section of this document.

The system 10 comprises a multiplier unit 48 that multiplies the estimated state signal $\hat{x}$ by the constant C. The resulting signal $\hat{y}$ is provided to difference node 46 to generate the tracking error signal $\tilde{y}=y-\hat{y}$ which reflects the difference in the actual output signal y to the estimated output signal $\hat{y}$. It is thus a measure of how closely the control system 10 is tracking the observed system 50, and it includes the effects generated by the disturbance d(t) on the observed system 50 for which control adaptation is desired.

A control unit 49 can be used to generate a control signal u based on virtually any other signal in the system. In the specific example shown, the control unit 49 is connected to receive the estimated state signal $\hat{x}$ which it uses to generate the control signal u. The control unit 49 and its connecting lines are shown in chain line to represent the fact that they are optional elements which may or may not be included, depending upon how the designer chooses to implement the system 10. In the embodiment shown in FIG. 1, the control unit 49 is connected to provide the control signal u to the actuator(s) 42 to control the state of the control system 10 with respect to the observed system 50. The nature of the actuator(s) 42 depends upon the particular application in which the control system 10 is used. For example, if the system 10 is a guidance control system of a vehicle tracking a target 50 (termed a "follower" herein), then the actuator(s) 42 can be attached to an air control surface for an aircraft or missile, a rudder or propeller for a ship, a thrust vector for an aircraft or spacecraft, fuel flow controller to an engine, or other such control element. If the system 10 is a telescope, microscope, radar or sonar tracking system, then the actuator(s) 42 may be configured to position the system 10 to better track the system 50. The actuator(s) 42 thus affects control of the state of the system 10 with respect to the state of the observed system 50. In one specific embodiment, the control unit 49 can be connected to multiplier 51 which multiplies the signal u($\hat{x}$) by the constant $B_2$ to produce signal $B_2u(\hat{x})$ provided to the summing node 24 of the filter 20 in accordance with Equation (6) which is set forth in a later part of this document.

Similarly to the actuator(s) 42, the sensor(s) 40 are selected for use in the control system 10 based upon the application to which the control system is applied. For example, the sensor(s) 40 can be implemented as a camera which can optionally be controlled or oriented via actuator(s) 42 of the system 10. Alternatively, or in addition, the sensor(s) 40 may be implemented as telemetric equipment for determining speed or orientation of system 10 relative to system 50. Alternatively, the sensor(s) 40 can comprise radar, sonar, optical, or another kind of sensor. The sensor(s) 50 can be mounted in a vehicle 10 of any kind, for example, a manned or unmanned air, land, water or space vehicle. Alternatively, or in addition to being mounted in a vehicle, one or more of the sensors can be located in a space station or ground station, for example, to observe a target.

The adaptive unit 30 comprises a training signal generator 32 and an adaptive element 34 implemented in this embodiment as a neural network 36. The training signal generator 32 generates the estimated training error signal vector ê (which could be an estimated state error signal) using the tracking error signal ỹ according to the equation:

$$\dot{\hat{e}} = (f_e(t,\hat{e}) - K(t)C^T)\hat{e} - \overline{K}(t)(\tilde{y} - \hat{\tilde{y}})$$

in which $\hat{\tilde{y}} = C^T \hat{e}$. As is evident in the above equation, the training signal generator 32 can be implemented as a linear error observer but is not limited to this design. The training signal generator 32 outputs the estimated training error signal vector ê to the neural network 36 of the adaptive element 34 for use in adapting the connection weights M̂. The observed system 50 is subject to disturbance d(t) which produces unmodeled dynamics and parametric uncertainty which impact the actual output signal y. The estimated training error signal ê generated by the training signal generator 32 enables the adaptive element 34 to effectively adapt to the effect of these disturbance d(t) so that the observed system 50 can be stably tracked.

In this embodiment, the adaptive unit 30 comprises a delay unit 38 for generating delayed values $y_d$ of the output signal y from sensor(s) 40 which sense the observed system 50 to be tracked. The delay unit 38 is identified in FIG. 1 in a chain-line box to indicate the element is optional, and other optional elements are indicated with a similar box. The delay unit 38 also generates delayed values $u_d$ of the control signal u generated by control unit 49 based on the estimated state signal x̂ from the filter 20.

The delay unit 38 can be implemented with a memory, register, buffer or tapped delay line to hold previous values of the signals y and u. From the delay unit 38, the signals y, $y_d$, u, $u_d$ are provided to the signal optimizer 44 which, based on these signals, generates the signal $\overline{\mu}$ input to the adaptive element 34.

In the case of implementing the adaptive element 34 as a neural network 36, its connection weights M̂ are adjusted using the estimated training error signal vector ê generated by the observer based on the tracking error signal ỹ=y−ŷ from node 46. The node 46 is connected to receive the actual output signal y from the sensor(s) 40 and the estimated output signal ŷ from the multiplier 48 which generates this signal by multiplying the output of the filter 20 by the constant C.

The neural network 36 receives as an input the signal $\overline{\mu}$ which it provides to its basis functions σ( ) and multiplies by estimated connection weights M̂ produced by the neural network based on the training error signal vector ê. The resulting augmenting adaptive signal $v_{ad} = \hat{M}^T \sigma(\overline{\mu})$ is provided to the multiplier 50 for multiplication by the constant $B_1$. The resulting signal $B_1 \hat{M}^T \sigma(\overline{\mu})$ is provided to the summing node 24 to generate the derivative $\dot{\hat{x}}$ of the estimated state signal x̂ in accordance with Equation (6) provided below.

The elements of FIG. 1 can be implemented in one or more analog or digital components connected together as shown in the Figure. Alternatively, one or more of the various components of the system 10 of FIG. 6 can be implemented as a computer program executed by a general or special purpose computer, which carries out the functions of the various elements in a control cycle which is repeatedly performed to track the system 50. An example of this system is shown in FIG. 3 discussed hereinafter.

Figure 2:
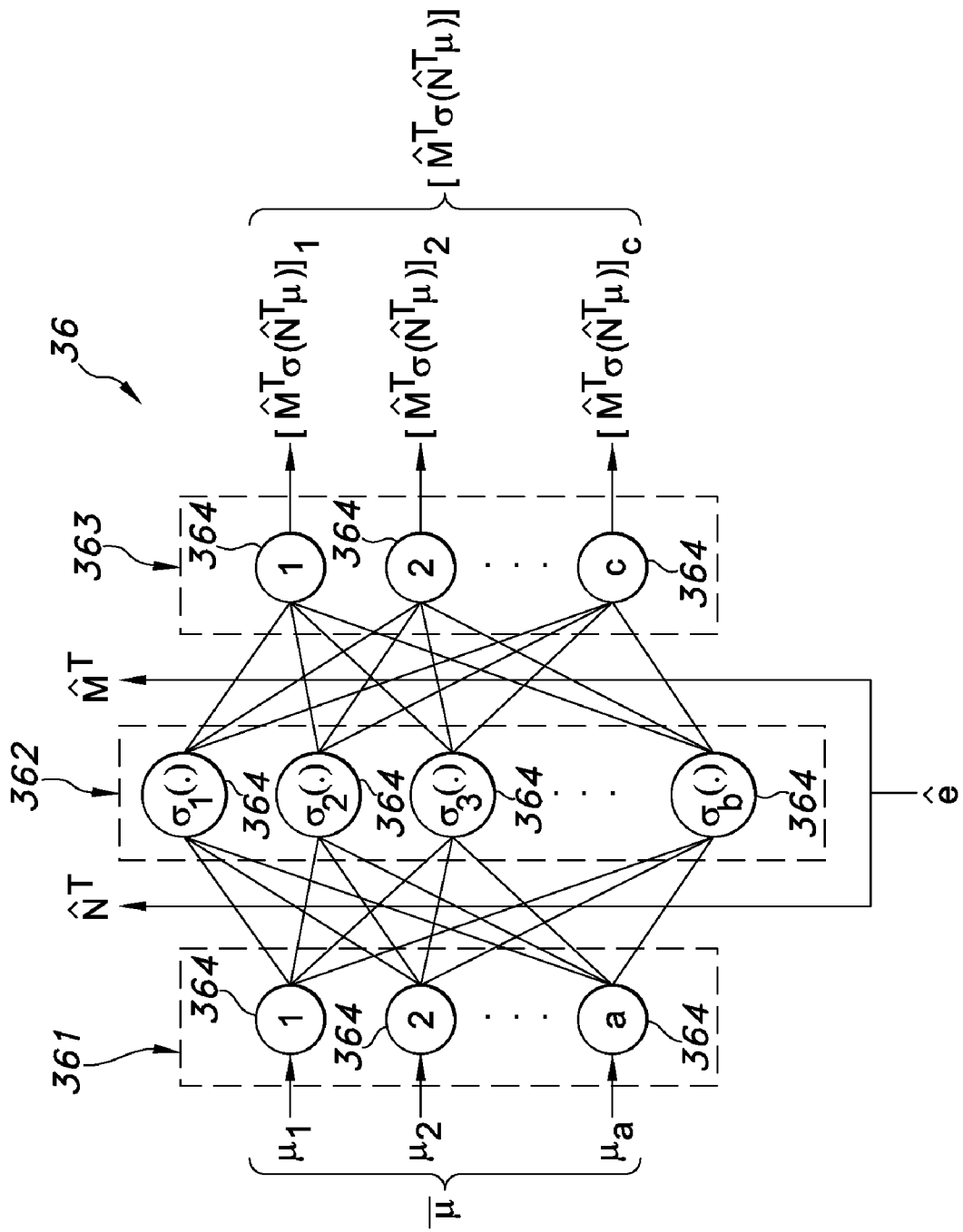
FIG. 2 is a diagram of a neural network comprising an input layer, hidden layer and output layer of neurons with connection weights N, M updated using the estimated training error signal $\hat{e}$ to account for unmodeled dynamics and uncertainty in the parameters input to the neural network.

FIG. 2 is a relatively detailed schematic view of an embodiment of the neural network 36 for tracking the observed system 50 in the presence of unmodeled dynamics and uncertainty in the parameters. The neural network 36 comprises an input layer 361, hidden layer 362, and output layer 363 of neurons 364. The neurons 364 of the input layer 361 are connected to receive the signal $\overline{\mu}$, which is a vector comprising the actual output signal y of the observed system 2, the control signal u (if any such signal is used), and delayed values $y_d$, $u_d$ of one or both of these signals. As shown in FIG. 2, the vector elements of the signal $\overline{\mu}(\mu_1, \mu_2, \ldots, \mu_a;$ a is a positive integer representing the number of components in the vector signal μ), are input to respective neurons 364 of the input layer 361 of the neural network 36. The components of the signal $\overline{\mu}(\mu_1, \mu_2, \ldots, \mu_a)$ are then output from the input layer 361 and multiplied by respective connection weights $\hat{N}^T$. In the specific embodiments described hereinafter, the connection weights $\hat{N}^T$ are set to the identity matrix. However, it should be understood that other embodiments of the invention can comprise connection weights $\hat{N}^T$ other than the identity matrix without departing from the scope of the invention. The resulting output is provided to the hidden layer 362 which comprises neurons 364 implementing basis functions σ so that the output of the hidden layer 362 is the signal vector $\sigma(\hat{N}^T\overline{\mu})$ ($[\sigma(\hat{N}_1^T\mu)]_1, [\sigma(\hat{N}_2^T\mu)]_2, \ldots, [\sigma(\hat{N}_b^T\mu)]_b$; b a positive integer denoting the number of basis-function neurons). The components of the signal $\sigma(\hat{N}^T\mu)$ are output from the hidden layer 362 and are multiplied by connection weights $\hat{M}^T$ to produce the signal $\hat{M}^T\sigma(\hat{N}^T\mu)$ ($[\hat{M}^T\sigma(\hat{N}^T\mu)]_1, [\hat{M}^T\sigma(\hat{N}^T\mu)]_2, \ldots, [\hat{M}^T\sigma(\hat{N}^T\mu)]_c$: c a positive integer denoting the number of neurons in the output layer 363). The connection weights $\hat{M}^T$ are modified based on the adaptive error signal ê according to relationships defined by Equations (6)-(8). The neurons 364 of the output layer 363 receive and output the vector signal $\hat{M}^T\sigma(\hat{N}^T\mu)$ ($[\hat{M}^T\sigma(\hat{N}^T\mu)]_1, [\hat{M}^T\sigma(\hat{N}^T\mu)]_2, \ldots, [\hat{M}^T\sigma(\hat{N}^T\mu)]_c$) as the output of the neural network 36.

Figure 3:
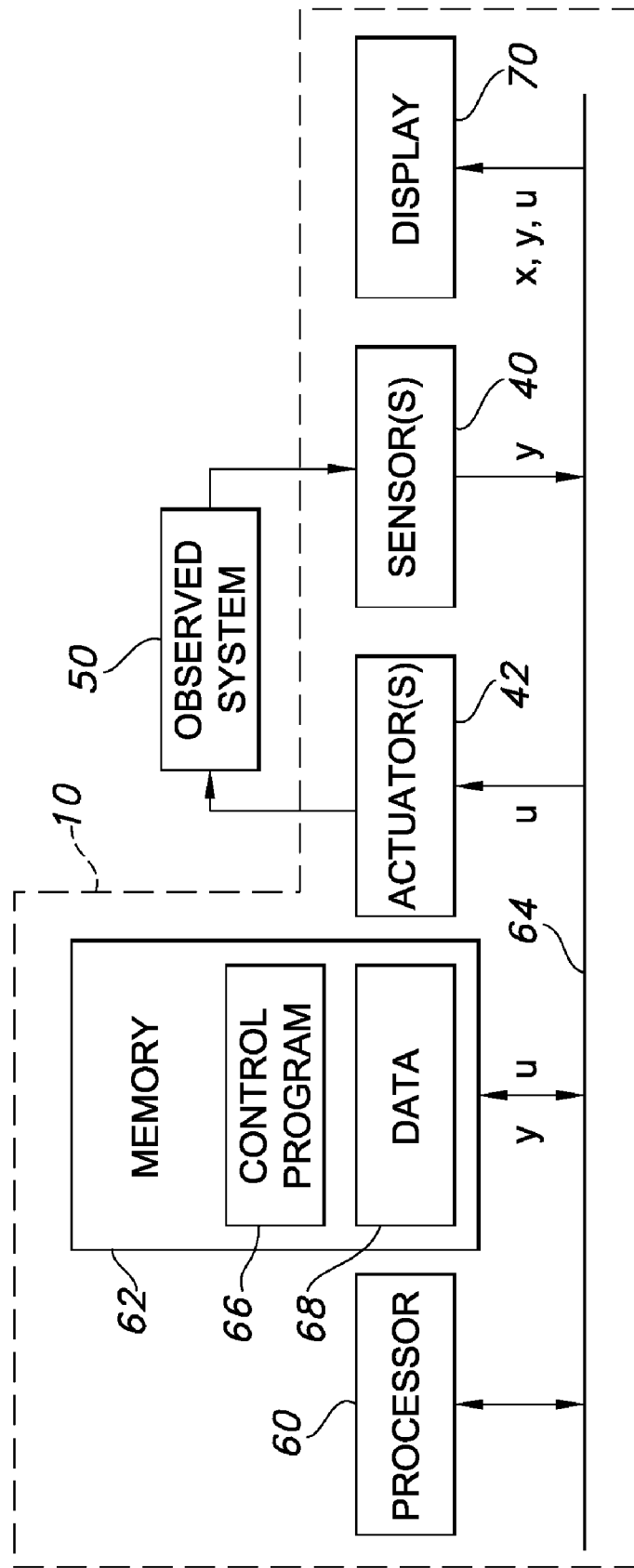
FIG. 3 is a block diagram of a general system of the invention implemented with a processor, a memory unit, and optional display unit, in which the processor executes a control program stored in the memory unit to implement and perform the functions of the filter and the adaptive unit of FIG. 1.

FIG. 3 is an embodiment of the control system 10 which comprises a processor 60 and a memory 62 connected via bus 64. Sensor(s) 40 are connected to the observed system 50 to generate the output signal y, and to provide this signal to the processor 60 via the bus 64. The processor 60 stores the received output signal y as data 68 in the memory 62. The actuator(s) 42 (if used) receive the control signal u from the processor 60 via the bus 64. The memory 62 stores a control program 66 and data 68. The control program 66 is coded to implement the functions of the filter 20 and the adaptive unit 30 upon execution by the processor 60. As it executes the control program 66, the processor 60 uses the actual output signal y to generate the estimated state signal x̂ which it can store as data 68 in the memory unit 62. The processor 60 may also execute the control program 66 to generate the control signal u based on the actual output signal y and can store the control signal u as data 68 in the memory unit 62. The memory 62 can be thus be configured to receive and store one or more of the estimated state signal x̂, actual output signal y or control signal u, or combinations of the same, from the processor 60 as part of the data 68. Moreover, the processor 60 can be capable of outputting current values, previous values, or both, of the estimated state signal x̂, actual output signal y or control signal u, or combinations of these signals, to a display unit 70 to generate a human-readable display. The display may thus include a tracking history of not only the current estimated state and actual output of the observed system, but also past values as well. The display unit 70 may be co-located with other elements of the system, or it can be positioned remotely to communicate wirelessly or by a physical connection such as wire or optical transmission media.

Figure 4:
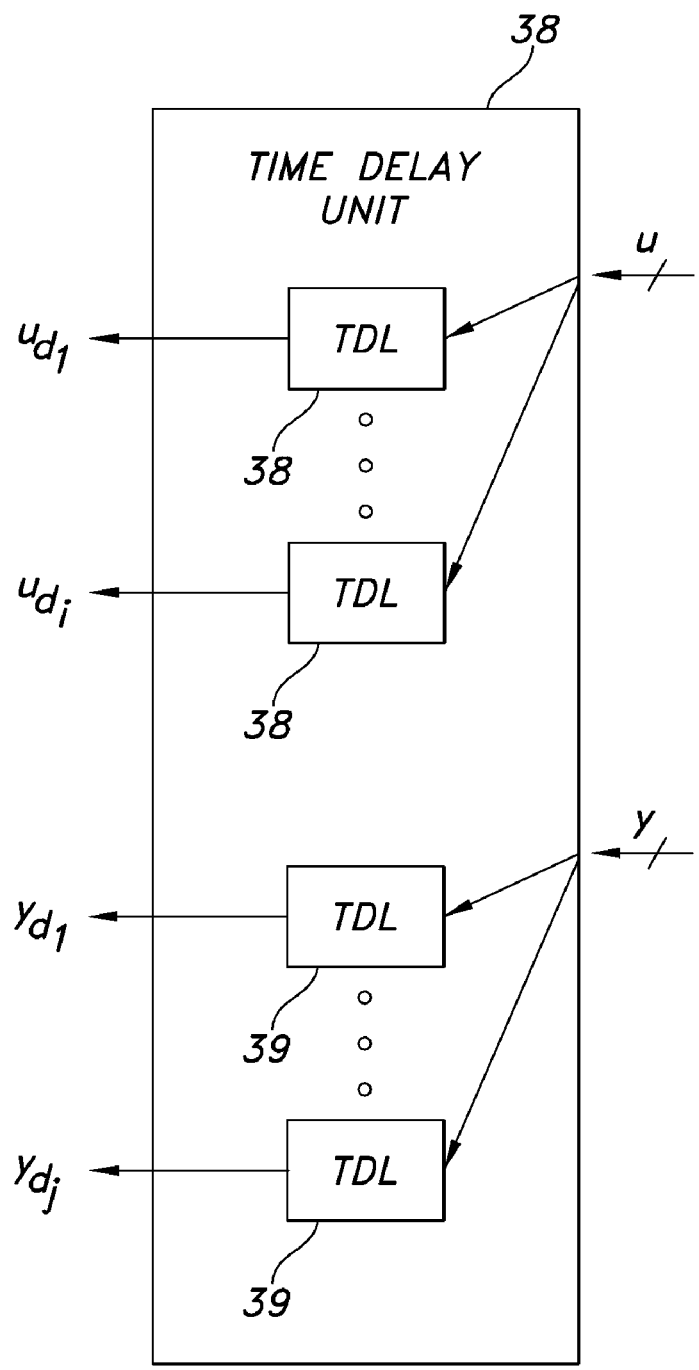
FIG. 4 is a block diagram of a time delay unit in accordance with an embodiment of the invention.

FIG. 4 is a block diagram of a time delay unit 38 of the tracking system 10 in accordance with FIG. 1. The time delay unit 38 can be implemented as signal path delays or a memory or buffer which stores current and past values of the control signal u (if used in the control system 1) and the actual output signal y from the observed system 50. The time delay unit 38 is coupled to receive the control signal u (if any) from the control unit 49, and the actual output signal y from the sensor(s) 40. The time delay unit 38 generates time-delayed values $u_{d1}, \ldots, u_{di}$ of the control signal u (assuming of course that such signal is used in the system 10) using delay elements $38_1, \ldots, 38_i$, in which i is a positive integer representing the number of time delay elements 38. Furthermore, the time delay unit 38 can comprise time-delay elements $39_1, \ldots, 39_j$ to generate respective signals $y_{d1}, \ldots, y_{dj}$ in which j is the number of time delay elements $39_1, \ldots, 39_j$ and corresponding delayed signals. The time delay elements can be provided as inputs to the adaptive element 34, or more specifically, the neural network unit 36. Ordinarily, the time increment between successive outputs will be equal. Thus, for example, in an exemplary embodiment, the signals $u_{d1}$, $y_{d1}$ can be delayed by 0.001 seconds from the current values of the signals u, y, the signals $u_{ds}$, $y_{ds}$ can be delayed by 0.002 seconds from the current values of the signals u, y, $u_{d3}$, $y_{d3}$ can be delayed by 0.003 seconds from the current values of the signals u, y, and so on. In one embodiment, the time delay unit 38 can be implemented by sampling the signals u, y and storing these samples in a buffer or memory. Alternatively, the time delay elements $38_1, \ldots, 38_i$ can be implemented as delay taps, signal path delay (e.g., delay lines or circulators), or other such elements. The use of the delayed signals $u_{d1}, \ldots, u_{di}$ and $y_{d1}, \ldots, y_{dj}$ helps to ensure that relevant states of the observed system 50 can be determined.

Figure 5A:
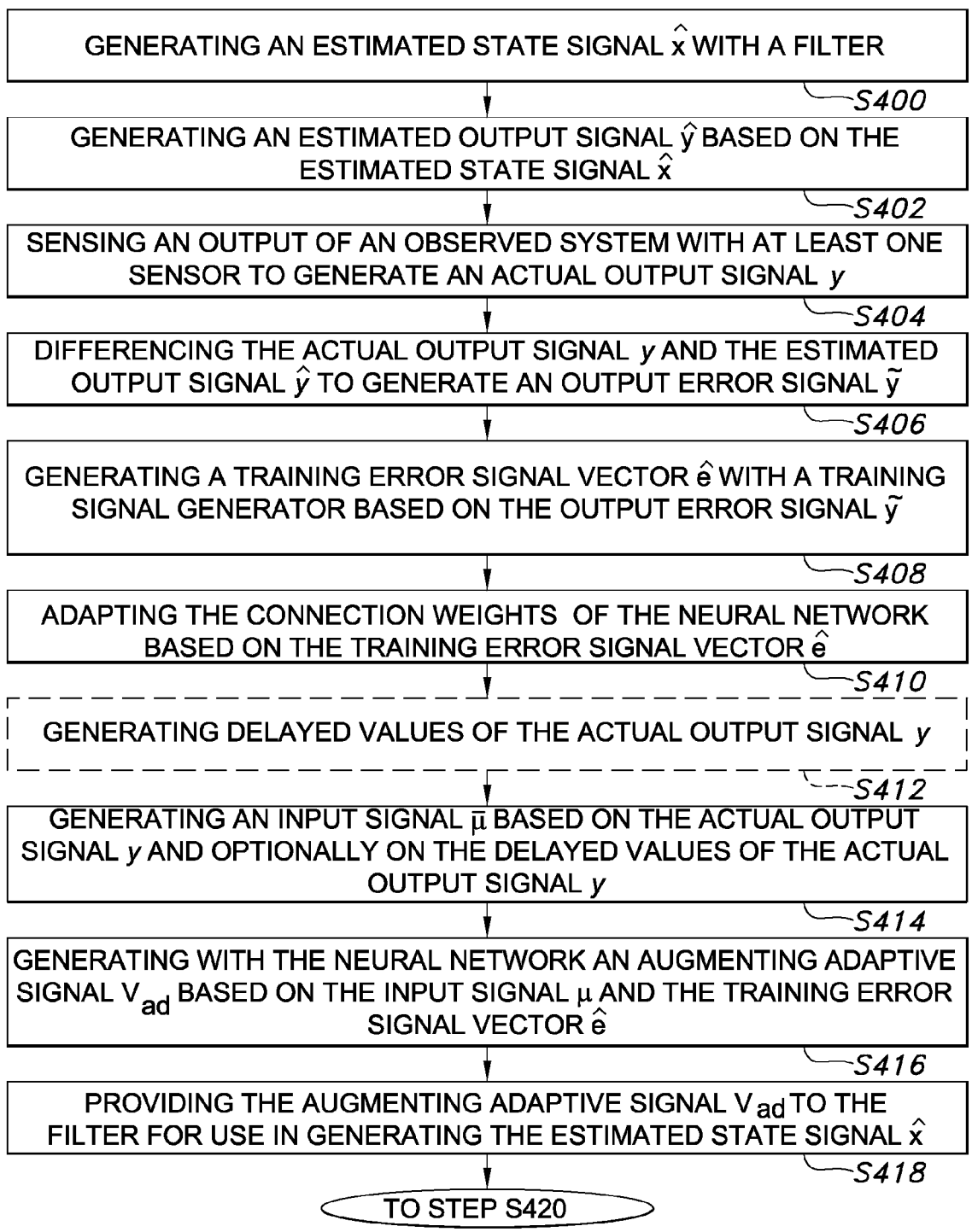
FIGS. 5A-5B are flowcharts of methods of the invention which describe the operation of the filter and adaptive unit of the system of FIGS. 1 and 3.
Figure 5B:
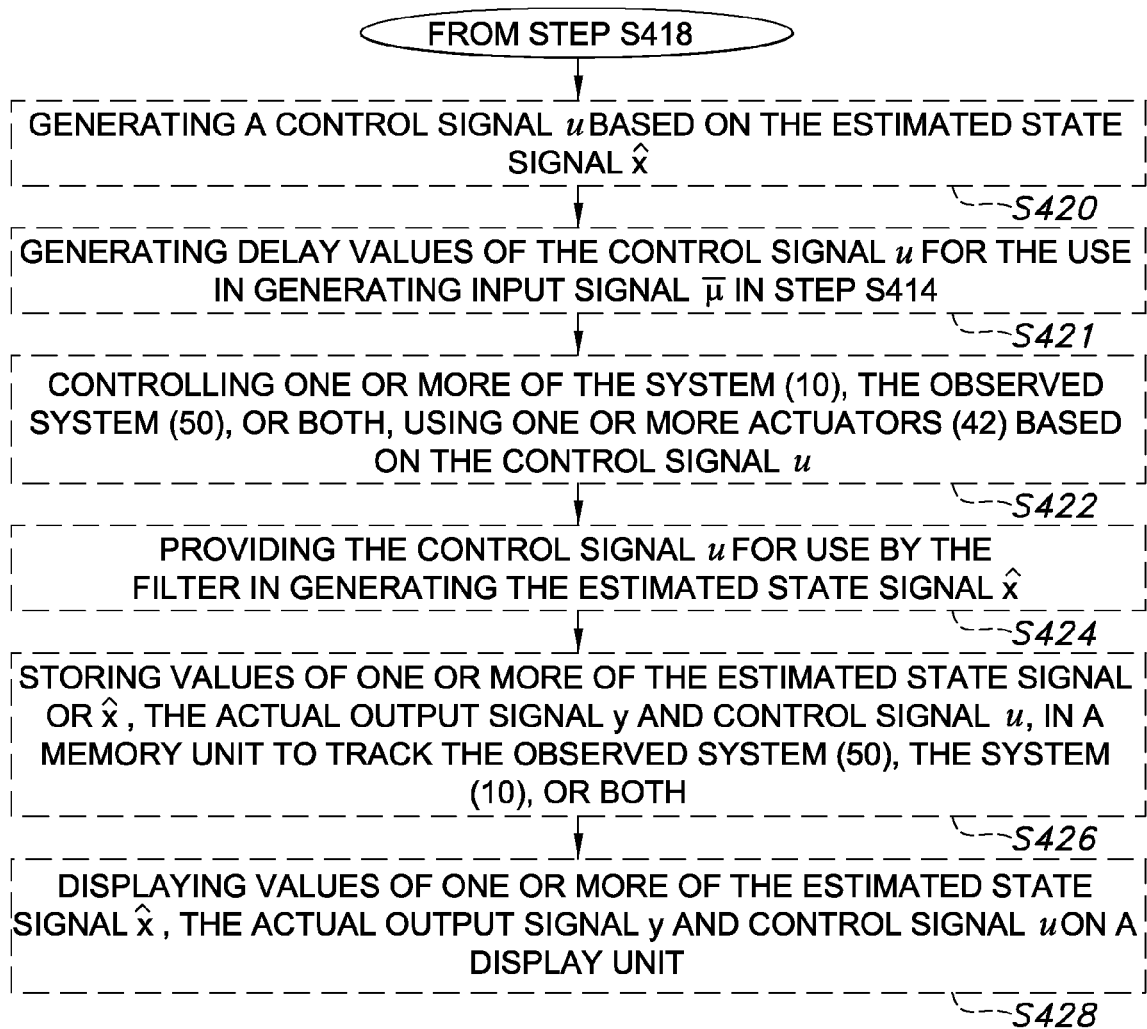

FIGS. 5A-5B are an embodiment of a method in accordance with the invention. In Step S400 of FIG. 5A, an estimated state signal $\hat{x}$ is generated with the filter 20. In Step S402, an estimated output signal $\hat{y}$ is generated based on the estimated state signal $\hat{x}$. In Step S404 the output of an observed system is sensed with at least one sensor to generate an actual output signal y. In Step S406 the actual output signal y and the estimated output signal $\hat{y}$ are differenced to generate an output error signal $\tilde{y}$. In Step S408 the training error signal vector $\hat{e}$ is generated with a training signal generator based on the output error signal $\tilde{y}$. In Step S410 the connection weights $\hat{M}^T$ of the neural network are adapted based on the training error signal vector $\hat{e}$. In Step S412 the delayed values $y_d$ of the actual output signal y are generated. Step S412 is indicated in broken line to signify it is an optional step. In Step S414 an input signal $\bar{\mu}$ is generated based on the actual output signal y and the delayed values $y_d$ of the actual output signal y. In Step S416 the method generates with the neural network an augmenting adaptive signal $v_{ad}$ (which can be $\hat{M}^T\sigma(\bar{\mu})$, as described above) based on the input signal $\bar{\mu}$ and the training error signal vector $\hat{e}$. In Step S418 the augmenting adaptive signal $v_{ad}$ is provided to the filter for use in generating the estimated state signal $\hat{x}$.

As shown in FIG. 5B the method can comprise additional steps. In Step S420 a control signal u is generated based on the estimated state signal $\hat{x}$. In Step S422 one or more of the system 10, the observed system 50, or both, is controlled using one or more actuators 42 based on the control signal u. In Step S422 the control signal u can be used to activate the actuators to position the system 10 to better observe the observed system 50. Alternatively, or in addition, the control signal u can be used to control the one or more actuators 42 to position the sensor relative to the observed system 50 based on the control signal u. Moreover, the control signal u can be used to control one or more actuators 42 to cause the system 10 to avoid the observed system 50. In Step S424 the control signal u is provided for use by the filter in generating the estimated state signal $\hat{x}$. This control signal u may be multiplied by the constant $B_2$ before it is supplied to the filter. In Step S426 the method can further comprise the step of storing values of one or more of the estimated state signal $\hat{x}$, the actual output signal y and control signal u, in a memory unit 62 to track the observed system 50, the system 10, or both. In Step S428 values of one or more of the estimated state signal $\hat{x}$, the actual output signal y and control signal u can be displayed on a display unit.

II. Specific Embodiments

The following is a relatively specific embodiment of the invention building upon the disclosure hereinabove and applying the same to a particular application in which the range between two aircraft, a target which is a "leader" and a "follower", is regulated by feeding back estimates of the target velocity obtained by processing camera images. The system 10 is thus used to accomplish a task in an unmanned system that is commonly performed in a manned system relying primarily on visual information obtained by the pilots. This application is approached from the point of view of using (i) bearings-only measurement and (ii) bearing angle and the angle subtended by the target in the image plane as measurements, which will be referred to as the 2-angles-only problem.

The following disclosure is structured as follows: Section IIA provides basic definitions and theorems which are required for the stability analysis. Section IIB sets up the problem under consideration and summarizes several important approximation properties of NNs. Section IIC presents the form of the adaptive unit and the formulation of the error dynamics. Section IID provides the stability analysis needed to prove the main theorem in the paper and the resulting ultimate bounds. In Section IIE the performance of the NN-based extended Kalman filter (EKF) system 10 is illustrated by considering the application of an aircraft called the follower, tracking another aircraft called the target. Section IIF presents the concluding remarks. Throughout the following disclosure bold symbols are used for vectors, capital letters for matrices, small letters for scalars, and $\|\cdot\|_F, \|\cdot\|$ stand for Frobenius norm and for 2-norm respectively unless otherwise specified.

Section IIA

Mathematical Preliminaries

Consider the nonlinear dynamical system $$\dot{x}=f(t,x), x(t_0)=x_0 \qquad (1)$$

in which $f:[0,\infty)\times D\to R^n$ is continuously differentiable, $D=\{x\in R^n|\|x\|_2<r\}$, and the Jacobian matrix $$\left[\frac{\partial f}{\partial x}\right]$$

is bounded and Lipschitz on D, uniformly in t.

Theorem 1: [36] H. K. Khalil. *Nonlinear Systems*. Prentice Hall, New Jersey, 2002 Let x=0 be an equilibrium point for the nonlinear system in (1). Let k, $\lambda$ and $r_0$ be positive constants with $$r_0 < \frac{r}{k}.$$

Let $D_0 = \{x \in R^n | \|x\| < r_0\}$. Assume that the trajectory of the system satisfies $\|x(t)\| \leq k\|x(t_0)\|e^{-\lambda(t-t_0)}, \forall x(t_0) \in D_0, \forall t \geq t_0 \geq 0$. Then, there is a $C^1$ function $V:[0,\infty) \times D_0 \to R$ that satisfies the inequalities $$c_1\|x\|^2 \leq V(t,x) \leq c_2\|x\|^2 \qquad (2)$$

$$\frac{\partial V}{\partial t} + \frac{\partial V}{\partial x}f(t,x) \leq -c_3\|x\|^2$$

$$\left\|\frac{\partial V}{\partial x}\right\| \leq c_4\|x\|$$

for some positive constants $c_1, c_2, c_3, c_4$.

In [37] N. Hovakimyan, H. Lee, and A. Calise. On approximate NN realization of an unknown dynamic system from its input-output history. *American Control Conference*, 2000, [38] E. Lavretsky, N. Hovakimyan, and Calise A. Reconstruction of continuous-time dynamics using delayed outputs and feedforward neural networks, *Accepted for publication in IEEE Transactions on Automatic Control*, it has been shown that for an observable system such an approximation can be achieved using a finite sample of the output history, i.e., the history of the actual output signal y(t) as described hereinabove. The main theorem from [38] is set forth in the form of the following existence theorem.

Theorem 2: [38] Assume that an n-dimensional state vector x(t), i.e., the actual state signal, of an observable time-invariant system $$\dot{x} = f(x)$$

$$y = h(x) \qquad (3)$$

evolves on an n-dimensional ball of radius $\bar{r}$ in $R^n$, $B_{\bar{r}} = \{x \in R^n, \|x\| \leq \bar{r}\}$. Also assume that the system's actual output signal $y(t) \in R^m$ and its derivatives up to the order (n-1) are bounded. Then given arbitrary $\epsilon^* > 0$, there exists a set of bounded weights $\hat{M}$ and a positive time delay $d > 0$, such that the function f(x) in (3) can be approximated over the compact set $B_{\bar{r}}$ by a single hidden layer (SHL) NN 36 as follows:

$$f(x) = M^T\sigma(\mu) + \epsilon(\mu), \|M\|_F \leq M^*, \|\epsilon(\mu)\|_F \leq \epsilon^*$$

using the input vector:

$$\mu(y(t),d) = [\Delta_d^{(0)}y^T(t) \ldots \Delta_d^{(n-1)}y^T(t)]^T \in R^{nm}$$

where $$\Delta_d^{(0)}y^T(t) \triangleq y^T(t), \Delta_d^{(k)}y^T(t) \triangleq \frac{\Delta_d^{(k-1)}y^T(t) - \Delta_d^{(k-1)}y^T(t-d)}{d},$$

$$k = 1, 2, \ldots, \|\mu\| \leq \mu^*, \mu^* > 0$$

is a uniform bound on $B_{\bar{r}}$.

Remark 1: If the dimension n of the system is not known, and only an upper bound $n_1 > n$ for its dimension is available, then, provided that the $(n_1-1)$ derivatives of the output signal y are bounded, one can use an input vector, comprised of $(n_1-1)$ quotients, while not sacrificing on the bound of the approximation.

Section IIB

Problem Formulation

Let the dynamics of an observable and bounded nonlinear system 10 be given by the following equations (For the definition on observability of nonlinear systems, refer to [39])

$$\dot{x} = f(x,z) = f_0(x) + Bz_1, x(0) = x_0$$

$$\dot{z} = h(z), z(0) = z_0$$

$$y = C^T x \qquad (4)$$

where $x \in D_x \subseteq R^{n_x}$, $z \in D_z \subseteq R^{n_z}$, are the states of the system, $D_x$ and $D_z$ are compact sets, $f_0(x):D_x \to R^{n_x}$ is a known smooth function which can be expressed as a Taylor series expansion for all the values of x in the domain of interest $D_x$, B and C are known matrices, $h(z):D_z \to R^{n_z}$ is an unknown function, $z_1 \in R^{n_{z1}}$ has a known upper bound, $\bar{z}_1$ and $y \in R^m$ is a vector of available measurements. The dimension $n_z$ of the vector z is unknown and hence the dimension $n = n_x + n_z$ is also unknown. The relative degree of the actual output signal y is defined to be the smallest value of r such that $$\frac{\partial y^{(i)}}{\partial z_1} = 0, i = 0, 1, \ldots, r-1 \text{ and } \frac{\partial y^{(r)}}{\partial z_1} \neq 0.$$

Section IIC

Adaptive Unit and Error Dynamics

Using Theorem 2, consider the following NN approximation of $z_1$ $$z_1 = M^T\sigma(\mu) + \epsilon(\mu), \|M\| \leq M^*, \|\epsilon(\mu)\| \leq \epsilon^* \qquad (5)$$

where M* denotes a known upper bound for the Frobenius norm of the weight in (5), $\mu$ is a vector of the difference quotients of the measurement actual output signal y as defined in (4). The following system 10 is proposed for the dynamics in (4)

$$\dot{\hat{x}} = f_0(\hat{x}) + B\hat{M}^T\sigma(\mu) + K(t)(y-\hat{y}), \hat{x}(0) = \hat{x}_0$$

$$\hat{y} = C^T\hat{x} \qquad (6)$$

where $\hat{M}$ is the estimate of the weight that is adjusted online and the gain history K(t) depends on the history of the past measurements, which is all uniquely defined by $x_0$ and $\hat{x}_0$. Denoting the tracking error signals $e = x - \hat{x}$ and $\tilde{y} = y - \hat{y}$ and the NN weight error $\tilde{M} = M - \hat{M}$, we can formulate the error dynamics as follows $$\dot{e} = (f_e(t,e) - K(t)C^T)e + B\tilde{M}^T\sigma(\mu) + B\epsilon(\mu)$$

$$\tilde{y} = C^T e \qquad (7)$$

in which $$f_e(t, e) = \sum_{i=1}^{\infty} \frac{1}{i!} \frac{\partial^i f_0}{\partial x^i}\bigg|_{\hat{x}(t)} e^{i-1}.$$ (5)

Assumption 1: We assume that for B=0, the equilibrium point e=0 of the error dynamics in (7) is exponentially stable regardless of the measurement history.

Remark 2: Notice in (7), when B≠0, and in the absence of the NN 36, (7) is input-to-state stable with the $z_1$ viewed as the input. This implies that e(t) is bounded as long as $z_1$ is bounded.

Section IID

Stability Analysis—Backstepping Approach

In this section it is shown through Lyapunov's direct method that the tracking error signal e and the NN weight error $\hat{M}$ are ultimately bounded. The arguments in the proof will be based on the idea of backstepping which enables a choice of a particular form of the Lyapunov function [36]. The error dynamics along with the adaptation law can be written as $$\dot{e} = (f_e(t,e) - K(t)C^T)e + B\tilde{M}^T\sigma(\mu) + B\epsilon(\mu)$$

$$\dot{\hat{M}} = -\Gamma_M(\sigma(\mu)\tilde{y}^T + k_\sigma \|\tilde{y}\|\hat{M})$$

$$\tilde{y} = C^T e$$ (8)

where $\Gamma_M$ specifies the learning rate of the NN 36 and $k_\sigma$ denotes the σ—modification gain [40] K. S. Narendra and A. M. Annaswamy. A new adaptive law for robust adaptation without persistent excitation. *IEEE Trans. Autom. Contr.*, 32(2):134-145, 1987. Defining $F_e(t,e) \triangleq (f_e(t,e) - K(t)C^T)e$ and using Assumption 1 and Theorem 1, when B=0 we are guaranteed the existence of a Lyapunov function $V_e(t,e)$ that satisfies conditions of Theorem 1.

Consider the composite error vector, $\zeta = [e^T \ \tilde{M}^T]^T$. Introduce the largest ball $B_R \triangleq \{\zeta \| \|\zeta\| \leq R\}$, R>0, that lies in $\Omega_\alpha \triangleq \{(e, \tilde{M})\}$.

Theorem 3: Let the initial errors, e(0) and $\tilde{M}(0)$, belong to the set $\Omega_\alpha$ in FIG. 1. Let Assumption 1 hold and let the NN adaptation law be given by $$\dot{\hat{M}} = -\Gamma_M(\sigma(\mu)\tilde{y}^T + k_\sigma\|\tilde{y}\|\hat{M})$$ (9)

where $$\frac{\gamma^2}{R^2 2c_1} < \Gamma_M < \frac{R^2}{\gamma^2 2c_1}, k_\sigma > 0.$$

Figure 6:
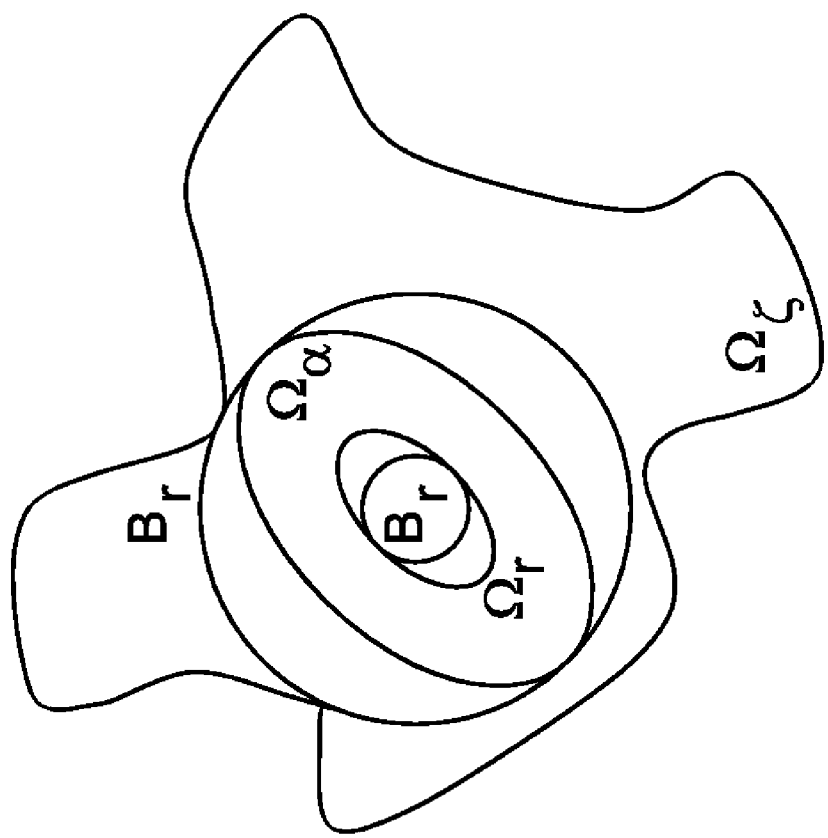
FIG. 6 is a diagram of the error space for the disclosed system demonstrating boundedness of the state error signal e and the connection weights $\hat{M}$ of the neural network indicating stability of the disclosed system.

Then the tracking error e(t) and the NN weight error $\tilde{M}(t)$ are uniformly ultimately bounded with the ultimate bound given by the right hand side of (15) and (16). FIG. 6 is a geometric representation of the sets in Error Space.

Proof: When B≠0, we choose the following Lyapunov function candidate to arrive at boundedness of the error signals $$V(t, e, \tilde{M}) = Ve(t, e) + \frac{1}{2}tr(\tilde{M}^T\Gamma_M^{-1}\hat{M})$$ (10)

The derivative of $V(t,e,\tilde{M})$ along (8) can be written as $$\dot{V} = \frac{\partial V_e}{\partial t} + \frac{\partial V_e}{\partial e}(F_e(t,e) + B\tilde{M}^T\sigma(u) + B\epsilon(\mu)) + tr(\tilde{M}^T(\sigma(\mu)\tilde{y}^T + k_\sigma\|\tilde{y}\|\hat{M}))$$ (11)

Using (5), Theorem 1 and the inequality $\|\sigma(\mu)\| \leq 1$, the derivative can be upper bounded as $$\dot{V} \leq -c_3\|e\|^2 + c_4\|e\|\|B\|\|\tilde{M}\|_F + c_4\|e\|\|B\|\epsilon^* + \|\tilde{y}\|\|\tilde{M}\|_F + k_\sigma\|\tilde{y}\|tr(\tilde{M}^T\hat{M})$$ (12)

Further using the inequalities $\|\tilde{y}\| \leq \|C\|\|e\|$ and $tr[\tilde{M}^T(M-\hat{M})] \leq \|\tilde{M}\|_F M^* - \|\tilde{M}\|_F^2$, and denoting $c_5 \triangleq c_4\|B\| + \|C\|$, we can upper bound the Lyapunov derivative as $$\dot{V} \leq -\|e\|(c_3\|e\| + \|\tilde{M}\|_F(k_\sigma\|C\|\|\tilde{M}\|_F - k_\sigma\|C\|M^* - c_5) - c_4\|B\|\epsilon^*)$$ (13)

Denoting $\kappa \triangleq k_\sigma\|C\|$ and completing the squares on $\|\tilde{M}\|_F$ ($\kappa\|\tilde{M}\|_F - \kappa M^* - c_5$) we finally obtain $$\dot{V} \leq -\|e\|\left(c_3\|e\| + \left(\sqrt{\kappa}\|\tilde{M}\|_F - \left(\frac{\kappa M^* + c_5}{2\sqrt{\kappa}}\right)\right)^2 - \frac{(kM^* + c_5)^2}{4\kappa} - c_4\|B\|\epsilon^*\right)$$ (14)

Thus either of the conditions $$\|e\| > \frac{(\kappa M^* + c_5)^2}{4\kappa c_3} + \frac{c_4\|B\|\epsilon^*}{c_3}$$ (15)

$$\|\tilde{M}\|_F > \frac{\kappa M^* + c_5}{2\kappa} + \sqrt{\frac{\kappa M^* + (\kappa M^* + c_5)^2}{4\kappa^2} + \frac{c_4\|B\|\epsilon^*}{\kappa}}$$ (16)

will guarantee $\dot{V}(t,e,\tilde{M}) < 0$ outside the compact set $B_\gamma = \{\zeta \in B_R \| \|\zeta\| \leq \gamma\}$.

Section IIE

Simulation Results

FIGS. 7A-12A, 7B-12B, 13 and 14 are graphs of the simulation results in the target-follower tracking application in two dimensions where the objective is to regulate the range between the target and the follower to two wing spans (approximately twenty-five meters). Simulation runs were performed for the case of bearings-only measurement and the two-angles case. The two-angles case uses measurements of the bearing angle and the angle subtended by the target in the image plane. An advantage of using two angles as measurements is that observability is preserved even when the follower aircraft is not maneuvering.

The system dynamics can be described in polar coordinates by the following set of nonlinear differential equations [27]:

$$\frac{d}{dt}\begin{bmatrix} \beta \\ \dot{r} \\ \overline{r} \\ \beta \\ \frac{1}{r} \\ b \end{bmatrix} = \begin{bmatrix} -2\dot{\beta}\frac{\dot{r}}{r} + \frac{1}{r}(a_y\cos\beta - a_x\sin\beta) \\ \dot{\beta}^2 - \left(\frac{\dot{r}}{r}\right)^2 + \frac{1}{r}(a_y\sin\beta + a_x\cos\beta) \\ -\frac{\dot{r}}{r}\frac{1}{r} \\ 0 \end{bmatrix} \quad (17)$$

and the measurements are given by the following equations:

$$\beta_m(t) = \beta(t) + v_\beta(t) \quad (18)$$

$$\alpha_m(t) = 2\tan^{-1}\left(\frac{b}{2r}\right) + v_\alpha(t)$$

Where $\beta$ is the bearing angle, $\alpha$ is the angle subtended by the target in the image plane, r represents the range between the target aircraft and the follower aircraft, b denotes the size of the target which is assumed to be constant and $a_x$ and $a_y$ are the horizontal relative acceleration components in a Cartesian frame. The measurement noise $v_\beta$ and $v_\alpha$ are band limited zero mean white noise processes with a standard deviation of 0.01. The initial covariance matrix was chosen as $P_0$=diag $[0.1^2\ 0.3\ 0.1^2\ 0.1\ 0.1^3]$.

FIGS. 7A-12A and 7BA-12B compare the performance of an extended Kalman filter (EKF) 20 alone versus the filter (EKF) 20 and neural network (NN) 36 operating together, for the bearings-only case when the target maneuvers in a sinusoidal manner with a target acceleration of 0.3 g. As seen from FIGS. 7A-12A the estimates of the EKF exhibit severe performance degradation. FIGS. 7B-12B show that there is a remarkable improvement when the EKF is augmented with the NN-based adaptive element. The inset in FIG. 8B shows the true and the estimated range on a magnified scale in the time interval [40, 120].

FIGS. 13 and 14 are generated for the two-angles case when the target maneuvers in a sinusoidal manner with a target acceleration of 0.3 g. FIG. 13 shows that the range estimate of the EKF is biased while the NN augmented EKF provides a nearly unbiased estimate. The inset in FIG. 13 shows the true and the estimated range on a magnified scale in the time interval [40, 120]. FIG. 14 shows the target size estimate error for the EKF and EKF+NN. The NN augmented EKF greatly reduces the bias in the error of the EKF estimate.

Section III

Conclusion of Description of Preferred Embodiments

This disclosure addressed the problem of tracking a randomly maneuvering target by augmenting an EKF 20 with an NN 36 adaptive element in order to improve the performance of the EKF. In contrast to previous approaches that augment an EKF with an NN based adaptive element, the approach of this disclosure is applicable to uncertain multivariable nonlinear systems with uncertain parameters and unmodeled dynamics connected to the process. The adaptive law is trained by an error signal that is generated from the residuals of the EKF. Boundedness of error signals is shown through Lyapunov's direct method and a backstepping argument. Simulations are used to show that augmenting the EKF with an NN helps in removing the bias in the range estimates and also improves the estimate of the target size. In the bearings-only case the NN was able to correct for the instability in the performance of the EKF.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for augmenting a filter to track an observed system having an actual output signal y that is observable, the system comprising:

a filter (20) comprising an observer or estimator for generating an estimated state signal $\hat{x}$ representing the state of the observed system, the filter (20) connected to receive an output error signal $\tilde{y}$ that is a difference between an actual output signal y and an estimated output signal $\hat{y}$, the estimated output signal $\hat{y}$ generated based on the estimated state signal $\hat{x}$, the filter further connected to receive an augmenting adaptive signal $v_{ad}$, the filter configured to generate an improved estimated state signal $\hat{x}$ based on the output error signal $\tilde{y}$ and the augmenting adaptive signal $v_{ad}$; and an adaptive unit (30) connected to receive the output error signal $\tilde{y}$, the adaptive unit configured to generate a training error signal vector $\hat{e}$ based on the output error signal $\tilde{y}$, the adaptive unit having an adaptive element (34) including a neural network (36) with connection weights updated based on the training error signal vector $\hat{e}$, the neural network further connected to receive an input signal $\bar{\mu}$ based on the actual output signal y, the adaptive unit generating the augmenting adaptive signal $v_{ad}$ based on the input signal $\bar{\mu}$ and training error signal vector $\hat{e}$, the adaptive unit connected to provide the augmenting adaptive signal $V_{ad}$ to the filter for use in generating the estimated state signal $\hat{x}$.

2. A system as claimed in claim 1 wherein the filter comprises a Kalman filter.

3. A system as claimed in claim 1 wherein the filter comprises an extended Kalman filter.

4. A system as claimed in claim 1 wherein the adaptive unit comprises a training signal generator to generate training error signal vector $\hat{e}$ based on the output error signal $\tilde{y}$.

5. A system as claimed in claim 4 wherein the neural network employs the following weight update law $$\dot{e} = (f_e(t,e) - K(t)C^T)e + B\tilde{M}^T\sigma(\bar{\mu}) + B\epsilon(\bar{\mu})$$

$$\dot{\hat{M}} = \Gamma_M(\sigma(\bar{\mu})\tilde{y}^T + k_\alpha\|\tilde{y}\|\hat{M})$$

$$\tilde{y} = C^T e$$

in which $$f_e(t, e) = \sum_{i=1}^{\infty} \frac{1}{i!} \frac{\partial^i f_0}{\partial x^i}\bigg|_{\hat{x}(t)} e^{i-1},$$

$\hat{M}$ is the connection weights of the neural network (36), $\sigma(\overline{\mu})$ are the basis functions of the neural network (36), $\Gamma_M$ is the learning rate of the neural network (36), and $k_\sigma$ is the σ-modification gain.

6. A system as claimed in claim 4 wherein the training signal generator comprises a linear error observer.

7. A system as claimed in claim 1 wherein the adaptive unit comprises a signal optimizer generating the input signal $\overline{\mu}$ based on the actual output signal y from one or more sensors.

8. A system as claimed in claim 1 further comprising:
a delay unit for generating delayed values $y_d$ of the actual output signal y being generated by at least one sensor, the delay unit connected to provide the actual output signal y and the delayed values $y_d$ for use in generating the input signal $\overline{\mu}$.

9. A system as claimed in claim 7 further comprising:
a signal optimizer connected to receive the actual output signal y and the delayed values $y_d$, the signal optimizer generating the input signal $\overline{\mu}$ based on the actual output signal y and the delayed values $y_d$.

10. A system as claimed in claim 1 further comprising:
a control unit connected to receive the estimated state signal $\hat{x}$, a derivative $\dot{\hat{x}}$ of the estimate state signal $\hat{x}$, the estimated output signal $\hat{y}$, the actual output signal y, the augmenting adaptive control signal $v_{ad}$, the input signal $\overline{\mu}$, the training error signal $\hat{e}$, or any combination of these signals, to generate a control signal u based on one or more of these signals, the control unit connected to provide the control signal u to control an actuator to affect the state of the observed system, or connected to the filter for use in generating the estimated state signal $\hat{x}$, or both.

11. A system for tracking an observed system, the system comprising:
a filter (20) connected to receive an output error signal $\tilde{y}$, and connected to receive an augmenting adaptive signal $v_{ad}=\hat{M}^T\sigma(\overline{\mu})$ multiplied by a constant $B_1$, for generating an estimated state signal $\hat{x}$ based on the output error signal $\tilde{y}$ and the signal $B_1\hat{M}^T\sigma(\overline{\mu})$;
an adaptive unit (30) connected to receive the output error signal $\tilde{y}$, and having a training signal generator (32) generating a training error signal vector $\hat{e}$ based on the output error signal $\tilde{y}$ and having an adaptive element including a neural network (36) with connection weights $\hat{M}$ updated based on the training error signal vector $\hat{e}$, the adaptive unit further having a delay unit for generating delayed values $y_d$ of an actual output signal y generated by at least one sensor based on dynamics of the observed system, the adaptive unit further having a signal optimizer receiving the delayed values $y_d$ of the actual output signal y to produce a normalized input signal $\overline{\mu}$ input to the neural network to generate the signal $B_1\hat{M}^T\sigma(\overline{\mu})$ input to the filter, the training signal generator generating the training error signal vector $\hat{e}$ and updating the connection weights $\hat{M}$ using the following equations $\dot{e}=(f_e(t,e)-K(t)C^T)e+B\tilde{M}^T\sigma(\overline{\mu})+B\epsilon(\overline{\mu})$ $\dot{\hat{M}}=\Gamma_M(\sigma(\overline{\mu})\tilde{y}^T+k_\sigma\|\tilde{y}\|\hat{M})$ $\tilde{y}=C^Te$ in which $$f_e(t, e) = \sum_{i=1}^{\infty} \frac{1}{i!} \frac{\partial^i f_0}{\partial x^i}\bigg|_{\hat{x}(t)} e^{i-1},$$

K(t) is the gain of the filter, B is a constant, $\hat{M}^T$ is the transpose of a matrix of the connection weights of the neural network (36), $\sigma(\overline{\mu})$ are the basis functions of the neural network (36), $\Gamma_M$ is the learning rate of the neural network (36), $\epsilon(\overline{\mu})$ is a disturbance error signal resulting from unmodeled dynamics, uncertainty in the neural network parameters, or both, and $k_\sigma$ is the σ-modification gain.

12. A system as claimed in claim 11 further comprising:
a control unit (49) connected to receive the estimated state signal $\hat{x}$ and generating a control signal $u(\hat{x})$ provided to at least one actuator to affect the state of the system, the observed system, or both.

13. A system as claimed in claim 12 further comprising:
a multiplier unit connected to receive the control signal $u(\hat{x})$ from the control unit, the multiplier unit multiplying the control signal $u(\hat{x})$ by the constant $B_2$ to generate the signal $B_2u(\hat{x})$, the multiplier unit connected to provide the signal $B_2u(\hat{x})$ to the filter for use in generating the estimated state signal $\hat{x}$.

14. A system as claimed in claim 12 wherein the delay unit is connected to receive the control signal $u(\hat{x})$ and generates delayed values $u_d$ of the control signal $u(\hat{x})$, the delay unit connected to provide the control signal u(x) and the delayed values $u_d$ to the signal optimizer for use in generating the normalized input signal $\overline{\mu}$.

15. A system as claimed in claim 11 wherein the system further comprises:
a node (46) connected to receive the actual output signal y sensed by at least one sensor, and an estimated output signal $\hat{y}$ generated based on the estimated state signal $\hat{x}$ from the filter, the node (46) generating the output error signal $\tilde{y}$ by differencing the actual output signal y and the estimated output signal $\tilde{y}$.

16. A system as claimed in claim 11 wherein the filter (20) is configured as a second order filter comprising a multiplier (22), a function unit (28), a summing node (24) and an integrator (26), the multiplier (22) connected to receive the output error signal $\tilde{y}$ and generating the signal $K(t)\tilde{y}$, the function unit (28) connected to receive the estimated state signal $\hat{x}$ and generating a signal $f(\hat{x})$, and the summing node (24) connected to receive the signal $B_1\hat{M}^T\sigma(\overline{\mu})$, the signal $K(t)\tilde{y}$ and the signal $f(\hat{x})$ and generating the derivative $\dot{\hat{x}}$ of the estimated state signal $\hat{x}$ based on the signal $B_1\hat{M}^T\sigma(\overline{\mu})$, the signal $K(t)\tilde{y}$ and the signal $f(\hat{x})$, the integrator (26) connected to receive the derivative $\dot{\hat{x}}$ of the estimated state signal $\hat{x}$ and generating the estimated state signal $\hat{x}$ based on the derivative $\dot{\hat{x}}$ of the estimated state signal $\hat{x}$.

17. A system as claimed in claim 11 wherein the system is configured for implementation in a first aircraft following a second aircraft that is the observed system.

18. A system as claimed in claim 11 wherein the system is configured for implementation in a first vehicle and the observed system is a second vehicle.

19. A system as claimed in claim 11 wherein the system is configured for implementation in a vehicle and the observed system is an obstacle to be avoided.

20. A system as claimed in claim 11 wherein the system is configured as an optical, radar or sonar tracking system controlled to be positioned relative to the observed system.

21. A system as claimed in claim 11 wherein the controlled system is a missile and the observed system is a target.

22. A system as claimed in claim 11 further comprising:
a memory unit configured to receive and store the estimated state signal $\hat{x}$ to track the observed system.

23. A system as claimed in claim 22 further comprising:
a display for receiving and displaying the estimated state signal $\hat{x}$ from the memory unit to display the tracking history of the observed system.

24. An apparatus comprising:
an adaptive unit (30) connected to receive an output error signal $\tilde{y}$ that is a difference between an actual output signal y from one or more sensors and an estimated output signal $\hat{y}$, the estimated output signal $\hat{y}$ generated based on an estimated state signal $\hat{x}$, the adaptive unit having a training signal generator generating a training error signal $\hat{e}$ based on the output error signal $\tilde{y}$, and having an adaptive element including a neural network with connection weights $\hat{M}$ updated based on the training error signal $\hat{e}$, the adaptive unit further having a delay unit for generating delayed values $y_d$ of an actual output signal y generated by at least one sensor based on dynamics the observed system, and generating delayed values $u_d$ of a control signal $u(\hat{x})$ generated by a control unit of the adaptive unit, the adaptive unit further having a signal optimizer generating a normalized input signal $\bar{\mu}$ based on the actual output signal y, the delayed values $y_d$, the control signal $u(\hat{x})$ and the delayed values $u_d$, the normalized input signal $\bar{\mu}$ input to the neural network to generate the augmenting adaptive signal $v_{ad} = \hat{M}^T \sigma(\bar{\mu})$ output to a summing node of a filter for use in generating one or more states of the observed system, including the estimated state signal $\hat{x}$, the augmenting adaptive signal $\hat{M}^T \sigma(\bar{\mu})$ being the only signal output from the adaptive unit to the filter.

25. A method comprising the steps of:
a) generating an estimated state signal $\hat{x}$ with a filter;
b) generating an estimated output signal $\hat{y}$ based on the estimated state signal $\hat{x}$;
c) sensing an output of an observed system with at least one sensor to generate an actual output signal y;
d) differencing the actual output signal y and the estimated output signal $\hat{y}$ to generate an output error signal $\tilde{y}$;
e) generating a training error signal $\hat{e}$ with a training signal generator based on the output error signal $\tilde{y}$;
f) adapting the connection weights of the neural network based on the training error signal $\hat{e}$;
g) generating delayed values $y_d$ of the actual output signal y;
h) generating an input signal $\bar{\mu}$ based on the actual output signal y and the delayed values $y_d$ of the actual output signal y;
i) generating with the neural network an augmenting adaptive signal $v_{ad}$ based on the input signal $\bar{\mu}$ and the training error signal $\hat{e}$; and j) providing the augmenting adaptive signal $v_{ad}$ to the filter for use in generating the estimated state signal $\hat{x}$.

26. A method as claimed in claim 25 further comprising the steps of:
k) generating a control signal $u(\hat{x})$ based on the estimated state signal $\hat{x}$;
l) controlling one or more of the system (10), the observed system (50), or both, using one or more actuators (42) based on the control signal $u(\hat{x})$; and
m) providing the control signal $u(\hat{x})$ for use by the filter in generating the estimated state signal $\hat{x}$.

27. A method as claimed in claim 26 wherein the control signal $u(\hat{x})$ is used to activate the actuators to position the system to better observe the observed system.

28. A method as claimed in claim 26 wherein the control signal $u(\hat{x})$ is used to control the one or more actuators to position the sensor relative to the observed system based on the control signal $u(\hat{x})$.

29. A method as claimed in claim 26 wherein the control signal $u(\hat{x})$ is used to control the one or more actuators to cause the system to avoid the observed system.

30. A method as claimed in claim 26 further comprising the step of:
n) storing values of one or more of the estimated state signal x, the actual output signal y and control signal $u(\hat{x})$, in a memory unit to track the observed system (50), the system (10), or both.

31. A method as claimed in claim 26 further comprising the step of:
n) displaying values of one or more of the estimated state signal $\hat{x}$, the actual output signal y and control signal $u(\hat{x})$ on a display unit.

32. A method as claimed in claim 25 further comprising the step of:
k) storing values of one or more of the estimated state signal $\hat{x}$ and the actual output signal y, or both, in a memory unit to track the observed system (50), the system (10), or both.

33. A method as claimed in claim 25 further comprising the step of:
k) displaying values of one or more of the estimated state signal $\hat{x}$ and the actual output signal y on a display unit.

34. A method as claimed in claim 25 further comprising the step of:
k) storing values of the estimated state signal $\hat{x}$ in a memory unit to track the observed system (50), the system (10), or both.

35. A method as claimed in claim 25 further comprising the step of:
k) displaying values of the estimated state signal $\hat{x}$ on a display unit.

36. A system as claimed in claim 11 wherein the filter and the adaptive unit are implemented by a processor that executes a control program stored in a memory unit, and the memory unit is configured to receive and store the estimated state signal $\hat{x}$ generated by the processor to track the observed system.

* * * * *